(12) United States Patent
Oledzki

(10) Patent No.: US 6,851,690 B1
(45) Date of Patent: Feb. 8, 2005

(54) VEHICLE SUSPENSION SYSTEM, PARTICULARLY FOR ROAD AND OFF-ROAD VEHICLES

(76) Inventor: Julian Wieslaw Oledzki, ul. Lipowa 18Am.2, 15-427 Bialystok, PL-15-427 (PL)

( * ) Notice: Subject to any disclaimer, the term of this patent is extended or adjusted under 35 U.S.C. 154(b) by 0 days.

(21) Appl. No.: 10/019,083

(22) PCT Filed: Apr. 19, 2000

(86) PCT No.: PCT/PL00/00030
§ 371 (c)(1),
(2), (4) Date: Dec. 26, 2001

(87) PCT Pub. No.: WO01/03958
PCT Pub. Date: Jan. 18, 2001

(30) Foreign Application Priority Data

Jul. 12, 1999 (PL) .............................................. P.334331

(51) Int. Cl.$^7$ ................................................ B60G 9/00
(52) U.S. Cl. .......................... 280/124.164; 280/124.166
(58) Field of Search ................... 280/124.106, 124.107, 280/124.116, 124.166, 124.128, 124.13

(56) References Cited

U.S. PATENT DOCUMENTS

| | | | | |
|---|---|---|---|---|
| 3,436,069 A | * | 4/1969 | Henschen | 267/279 |
| 3,687,479 A | * | 8/1972 | Kober | 280/124.13 |
| 3,844,583 A | * | 10/1974 | Sakow et al. | 280/124.102 |
| 4,010,941 A | * | 3/1977 | Kirkland | 267/273 |
| 4,488,736 A | * | 12/1984 | Aubry et al. | 280/5.52 |
| 4,744,588 A | * | 5/1988 | Wharton | 280/124.13 |
| 5,326,128 A | * | 7/1994 | Cromley, Jr. | 280/656 |
| 5,374,075 A | * | 12/1994 | Lee | 280/86.754 |
| 6,176,501 B1 | * | 1/2001 | Bartolone | 280/86.756 |

FOREIGN PATENT DOCUMENTS

DE            23 32 387 A1  *  1/1975

* cited by examiner

*Primary Examiner*—Paul N. Dickson
*Assistant Examiner*—Toan C To

(57) ABSTRACT

This invention relates to vehicle suspension, destined particularly for heavy road and off-road vehicles and first of all for those whose weight and dynamical loads vary within a broad range during the operating process, and is particularly concerned with improvements to the suspension characteristic, i.e. suspension stiffness as a function of axle deflection. The suspension according to the invention is distinguished for the fact that it comprises at least one flat or spatial four-link mechanism (K), (M), (W) and (D) three kinematic pairs of which are rotational ones and one is a rotational or a sliding one, wherein two links of said mechanism are made in the form of eccentric and one link is made in the form of eccentric or slider, wherein one of the links of said mechanism is coupled with vehicle's wheel, another link of the mechanism is coupled with a spring (S), and the whole mechanism is mounted to the vehicle frame using yet another of its links, to get a non-linear differentiable dependence of the suspension stiffness on the vehicle wheel deflection.

8 Claims, 21 Drawing Sheets

VEHICLE SUSPENSION SYSTEM, PARTICULARLY FOR ROAD AND OFF-ROAD VEHICLES

TECHNICAL FIELD OF THE INVENTION

The present invention relates to a vehicle suspension system, particularly for road and off-road vehicles such as trailers and semi-trailers, trucks, buses and military vehicles (including tanks), and first of all for those whose weight and dynamical loads vary within a broad range during the operating process, and is particularly concerned with improvements to the suspension damping characteristic, i.e. the suspension answer force as a function of road wheel deflection. The invention provides a vehicle suspension system with non-linear differentiable damping characteristic and progressive suspension rate produced out of linear characteristic of ordinary steel springs of constant spring rate. Suspension unit according to the present invention features simple and extraordinarily compact and robust structure.

BACKGROUND OF THE INVENTION

The main function of vehicle suspension is to dampen and reduce dynamical loads (e.g. vibrations) transferred to vehicle body by vehicle wheels. To do its work in the optimal way vehicle suspension should have suitably variable suspension rate and thus nonlinear (progressive) damping characteristic, capable of being adjusted to vehicle weight and dynamical loads.

Suspensions of automotive vehicles are fitted with steel springs such as leaf springs, coil springs, torsion bars, as well as solid rubber elements and pneumatic springs and hydropneumatic elements.

All the types of steel springs alluded to above feature, in principle, constant spring rate and thus linear characteristic. Vehicle suspensions fitted with steel springs are compact, robust, durable and reliable, but they usually feature constant suspension rate and linear damping characteristic inherited from the linear characteristic of the steel spring they use, which is considerably inferior to that of the pneumatic suspension. Vehicle suspensions with steel springs can be made progressive e.g. by applying several in turn actuating springs; then a non-differentiable progressive damping characteristic of the suspension is being obtained. Some of them, e.g. those using coil springs, can be made progressive without disturbing the differentiability of their characteristic. However in both these cases the suspension damping characteristic still remains substantially inferior to that of the pneumatic and hydro-pneumatic ones.

Pneumatic and hydro-pneumatic vehicle suspensions feature favorable differentiable progressive damping characteristic, but they are expensive and much less durable and reliable than suspensions fitted with steel springs. Moreover, a major disadvantage of both the suspensions in question is that their damping characteristic is determined by the thermodynamic parameters of the gas (air or nitrogen) they utilize (namely the adiabatic exponential), and therefore cannot be freely adjusted to specific requirements. Moreover, the damping characteristic of such suspensions is still far from optimal.

A common feature of all commonly used vehicle suspension systems is that their characteristic is determined in great part by the characteristic of the spring being used, and therefore is hard to make optimum.

Some unconventional vehicle suspension systems providing non-linear damping characteristic and means for adjusting it are known from prior art. For example the International Publication WO-A-96 11815 of the International Application PCT/CA 95/00570 discloses a suspension system, in which the suspension arm rotates roller carriers, the rollers contained therein follows cam surfaces, which in turn force a spring supports to move axially and to compress the spring. The U.S. Pat. No. 3,157,394 granted to Mr. O. K. Kelley in 1964 provides another example of suspension with a cam mechanism, a number of in turn actuated Belleville springs and non-linear non-differentiable damping characteristic. However nonlinearity of the damping characteristic of these suspensions is achieved by engaging springs through a cam mechanism, and means for adjusting the characteristic are shape of the cam, its position relative other elements of the suspension mechanism and nuts to regulate the initial length of the spring. Consequently, these suspensions are excessively complicated, of questionable, if not doubtful, durability and reliability, unable to cope with large loads, and means for adjusting damping characteristic of them are completely unsatisfactory. Another example of variable rate vehicle suspension is provided by the U.S. Pat. No. 4,010,941 granted to Mr. A. C Kirkland in 1977. In this example variability of spring rate of torsion bars, and thus variability of suspension rate of vehicle suspension fitted with torsion bars, is attained by providing means to vary torsion bar's length. Again this suspension is far from being satisfactory for at least the following reasons: For the first, to adjust (increase) the torsion bar spring rate to increasing vehicle weight, the length of said torsion bar is being decreased, which diminishes the spring capability of accumulating potential energy. For the second, means for adjusting suspension rate can by applied exclusively to suspensions using torsion bars. For the third, means for adjusting suspension rate are not capable of varying the spring rate continuously, and therefore the damping characteristic of the suspension is not differentiable and far from optimal.

Thus there is a need for a vehicle suspension combining and even exceeding the advantages of both the steel and hydro-pneumatic suspensions, having differentiable non-linear damping characteristic capable of being freely adjusted to any specific requirements.

SUMMARY OF THE INVENTION

It is therefore an object of the invention to provide a universal vehicle suspension system of extraordinarily compact and robust structure, which features continuously differentiable strongly non-linear damping characteristic (and which, thanks to the suitable non-linearity of its damping characteristic and continuity of the differential of the characteristic, has progressive suspension rate (i.e. suspension stiffness)) produced out of linear characteristic of conventional steel springs of constant spring rate.

Another object of the invention is to provide a vehicle suspension, the damping characteristic of which can be freely modeled according to any specific requirements.

Yet another object of the invention is to provide a compact vehicle suspension unit destined for new vehicles which also can be easily assembled in existing vehicles during overhauls e.g. in tanks, and which improves substantially the shock absorption within the whole range of dynamical loads and vehicle weight variations.

Thus the suspension according to the present invention is a purely mechanical device, and its most outstanding feature is that it produces a strongly non-linear differentiable damping characteristic (which considerably betters that of the hydro-pneumatic suspension) using only standard steel springs (or elements made of solid rubber) of linear characteristic. Another important feature of the suspension according to the present invention is that its damping characteristic can be freely modeled through the appropriate choice of the geometry of its components, without limitations typical for other types of suspension, including the hydro-pneumatic one.

Moreover, the suspension according to the invention is very simple and has an extraordinarily compact and robust structure, and is self-sufficient in the sense that no additional elements are needed to hold vehicle's road wheel. Non-linearity of damping characteristic of the suspension according to the present invention as well as means for adjusting it to specific requirements is derived directly from the kinetic of four bar linkage. It contains no foreign ad hoc incorporated parts e.g. cams, and features extraordinarily compact and robust structure. In fact the structure of the mechanism of the suspension according to the present invention is the strongest one in existence, as its moving parts occupy the whole internal space of its body.

The manufacturing technology of the suspension is simple and inexpensive. Moreover, the suspension provides the possibility of a relative position between road wheel arm the road wheel itself and spring, to be freely adjusted.

The main idea behind the suspension according to the present invention is to apply at least one flat or spatial (spherical) four-link mechanism, all kinetic couples of which are rotational ones, and (three) moving links of which assume the general form of flat or spatial eccentric and fill the whole internal space of the fourth mechanism link (called the mechanism body). One link of said mechanism is coupled with a vehicle road wheel (through e.g. a trailing or transverse arm), another fink of said mechanism is coupled with a spring, and the whole mechanism is fastened to the vehicle frame using another link to obtain a non-linear differentiable dependence of deformation of the spring on the road wheel flex and therefore a non-linear differentiable damping characteristic of the suspension and the progressiveness of the suspension rate.

The general principle behind the arrangement of the suspension units described below is to couple vehicle's road wheel with one link of the suspension mechanism, to fasten the suspension mechanism to the vehicle frame through another link of said suspension mechanism, and to place a spring among two links of the suspension mechanism. In the case the link of said suspension mechanism coupled with the vehicle road wheel is adjacent to the link, through which the suspension mechanism is fastened to the vehicle frame, the spring is not placed between these two links.

Thus the desired result is obtained when said suspension's mechanism, according to the invention, is a flat one, and comprises a shaft fitted with an eccentric, which is coupled rotationally with an intermediate eccentric, the latter being coupled rotationally with a disc, while the shaft and the disc pivot directly in the mechanism body. The body is fastened to a vehicle frame. The shaft in turn is coupled rigidly with the vehicle axle or vehicle wheel arm. In this arrangement of the suspension according to the present invention placement of a spring relative said suspension mechanism links is as follows. Either the disc is coupled with one end of the spring, the other end of which is coupled with the vehicle axle or the vehicle wheel arm or the intermediate eccentric, or is fixed to the body of the mechanism or directly to the vehicle frame; or the intermediate eccentric is coupled with one end of the spring, the other end of which is coupled with the vehicle axle or the vehicle wheel arm, or is fixed to the body of the mechanism or directly to the vehicle frame.

In this arrangement the axes of rotation of all the kinetic pairs of the suspension mechanism are parallel to each other.

A good result is also obtained when the suspension four link mechanism is a flat one, and comprises a shaft fitted with an eccentric, which is coupled rotationally with an intermediate eccentric which, in turn, is coupled rotationally with a disc, while the shaft and the disc pivot directly in the mechanism body, the latter being fastened to a vehicle frame. Besides, the disc is coupled rigidly with the vehicle axle or the vehicle wheel arm. In this arrangement of the suspension according to the present invention placement of a spring relative said suspension mechanism links is as follows. Either the shaft is coupled with one end of the spring, the other end of which is coupled with the vehicle axle or the vehicle wheel arm or the intermediate eccentric, or is fixed to the body of the mechanism or directly to the vehicle frame; or the intermediate eccentric is coupled with one end of the spring, the other end of which is coupled with the vehicle axle or the vehicle wheel arm, or is fixed to the body of the mechanism or directly to the vehicle frame.

In this arrangement the axes of rotation of all the kinetic pairs of the suspension mechanism are parallel to each other.

The demanded result is also obtained when the suspension mechanism is a flat one, and comprises a shaft fitted with a flange and an eccentric, the latter being coupled rotationally with an intermediate eccentric which, in turn, is coupled rotationally with a disc, while the shaft and the disc pivot directly in the mechanism body. The shaft is fastened to a vehicle frame with the help of the flange, while the intermediate eccentric is coupled rigidly with the vehicle axle or the vehicle wheel arm. In this arrangement of the suspension according to the present invention placement of a spring relative said suspension mechanism links is as follows. Either the mechanism body is coupled rigidly with one end of the spring, the other end of which is coupled with the vehicle axle or the wheel arm or the disc, or is fastened to the shaft or directly to the vehicle frame; or the disc is coupled with one end of the spring, the other end of which is coupled with the vehicle axle or the wheel arm or is fastened to the shaft or directly to the vehicle frame.

In this arrangement the axes of rotation of all the kinetic pairs of the suspension mechanism are parallel to each other.

The demanded result is also obtained when the suspension mechanism is a flat one, and comprises a shaft fitted with a flange and an eccentric, the latter being coupled rotationally with an intermediate eccentric which, in turn, is coupled rotationally with a disc, while the shaft and the disc pivot directly in the mechanism body. The shaft is fastened to a vehicle frame through the flange, while the disc is coupled with the vehicle axle or the vehicle wheel arm. In this arrangement of the suspension according to the present invention placement of a spring relative said suspension mechanism links is as follows. Either the mechanism body is coupled rigidly with one end of the spring, the other end of which is coupled with the vehicle axle or the wheel arm or the intermediate eccentric, or is fastened to the shaft or directly to the vehicle frame; or the intermediate eccentric is coupled with one end of the spring, the other end of which is coupled with the vehicle axle or the wheel arm or is fastened to the shaft or directly to the vehicle frame.

In this arrangement the axes of rotation of all the kinetic pairs of the suspension mechanism are parallel to each other.

A good result is also obtained when the suspension unit comprises two flat four link mechanisms and a steel spring in the form of U-shaped torsion bar, wherein each mechanism as its four links comprises a shaft fitted with an eccentric, which is coupled rotationally with an intermediate eccentric, the latter in turn being coupled rotationally with a disc, whereas the shaft and the disc pivot directly in the mechanism body. The body of each mechanism is fastened to a vehicle frame, and the shaft is coupled rigidly with a wheel arm, while the intermediate eccentric is coupled with one end of the U-shaped torsion bar, the other end of which is fastened to the intermediate eccentric of the analogous mechanism of the suspension of the other wheel. In this arrangement the axes of rotation of all the kinetic pairs of each suspension's mechanism are parallel to each other.

All the embodiments of the invention described above have analogs using spatial mechanisms.

Thus the demanded result is also obtained when the suspension mechanism, according to the invention, is a spatial one, and comprises a shaft fitted with a spatial eccentric form (a link assuming the general form of eccentric and rotating relative two other elements of the mechanism around two axes, which lie in a common plane and intersect at a non-zero angle), which is coupled rotationally with an intermediate spatial eccentric, the latter, in turn, being coupled rotationally with another spatial eccentric called disc, whereas the shaft and the disc pivot directly in the mechanism body. The shaft and the disc have similar structure and differ primarily by their respective kinetics. The body is fastened to a vehicle frame and the shaft is coupled rigidly with the vehicle axle or the vehicle wheel arm. In this arrangement of the suspension according to the present invention placement of a spring relative said suspension mechanism links is as follows. Either the disc is coupled with one end of the spring, the other end of which is coupled with the vehicle axle or the vehicle wheel arm or the intermediate eccentric, or is fixed to the body of the mechanism or directly to the vehicle frame; or the intermediate eccentric is coupled with one end of the spring, the other end of which is coupled with the vehicle axle or the vehicle wheel arm, or is fixed to the body of the mechanism or directly to the vehicle frame.

The suspension is in accordance with the invention provided that the axes of rotation of all the kinetic pairs of the suspension mechanism intersect at a precisely one point P.

A good result is also obtained when the suspension mechanism, according to the invention, is a spatial one, and comprises a shaft fitted with a spatial eccentric, which is coupled rotationally with an intermediate spatial eccentric, which in turn, is coupled rotationally with another spatial eccentric called disc. The shaft and the disc pivot directly in the mechanism body, which is fastened to a vehicle frame. Besides, the disc is coupled rigidly with the vehicle axle or the vehicle wheel arm. In this arrangement of the suspension according to the present invention placement of a spring relative said suspension mechanism links is as follows. Either the shaft is coupled with one end of the spring, the other end of which is coupled with the vehicle axle or the vehicle wheel arm or the intermediate eccentric, or is fixed to the body of the mechanism or directly to the vehicle frame; or the intermediate eccentric is coupled with one end of the spring, the other end of which is coupled with the vehicle axle or the vehicle wheel arm, or is fixed to the body of the mechanism or directly to the vehicle frame.

The suspension is in accordance with the invention provided the axes of rotation of all the kinetic pairs of said suspension's mechanism intersect at a precisely one point P.

A good result is also obtained when the suspension mechanism, according to the invention, is a spatial one, and comprises a shaft fitted with flange and a spatial eccentric, which is coupled rotationally with an intermediate spatial eccentric, which is in turn coupled rotationally with a disc whereas the shaft and the disc pivot directly in the mechanism body. The shaft is fastened to a vehicle frame with the help of the flange, whereas the intermediate eccentric is coupled rigidly with the vehicle wheel arm. In this arrangement of the suspension according to the present invention placement of a spring relative said suspension mechanism links is as follows. Either the mechanism body is coupled rigidly with one end of the spring, the other end of which is coupled with the vehicle axle or the wheel arm or the disc, or is fastened to the shaft or directly to the vehicle frame; or the disc is coupled with one end of the spring, the other end of which is coupled with the vehicle axle or the wheel arm or is fastened to the shaft or directly to the vehicle frame.

The suspension is in accordance with the invention provided the axes of rotation of all the kinetic pairs of said suspension mechanism intersect at a precisely one point P.

The demanded result is also obtained when the suspension mechanism is a spatial one, and comprises a spatial eccentric-shaped disc fitted with a flange, said disc being coupled rotationally with an intermediate spatial eccentric which, in turn, is coupled rotationally with a spatial eccentric on a shaft, while the shaft and the disc pivot directly in the mechanism body. The disc is fastened to a vehicle frame through the flange, while the shaft is coupled with the vehicle axle or the vehicle wheel arm. In this arrangement of the suspension according to the present invention placement of a spring relative said suspension mechanism links is as follows. Either the mechanism body is coupled rigidly with one end of the spring, the other end of which is coupled with the vehicle axle or the wheel arm or the intermediate eccentric, or is fastened to the shaft or directly to the vehicle frame; or the intermediate eccentric is coupled with one end of the spring, the other end of which is coupled with the vehicle axle or the wheel arm or is fastened to the disc or directly to the vehicle frame.

A good result is also obtained when the suspension unit according to the invention comprises two four link spatial mechanisms and a spring in the form of a U-shaped torsion bar, whereas each mechanism as its four links comprises a shaft fitted with a spatial eccentric, which is coupled rotationally with an intermediate spatial eccentric, the latter, in turn, is coupled rotationally with a disc assuming the form of a spatial eccentric, whereas the shaft and the disc pivot directly in the mechanism body. Additionally, the body of each mechanism is fastened to a vehicle frame, and the shaft is coupled rigidly with a vehicle wheel arm, while the intermediate eccentric is coupled with one end of the U-shaped torsion bar, the other end of which is fastened to the intermediate eccentric of the analogous mechanism of the suspension of the other wheel. The suspension is in accordance with the invention provided that the axes of rotation of all the kinetic pairs of each of the suspension mechanisms intersect at a precisely one point P.

The above-mentioned and other objectives, features and advantages of the present invention will be further understood by those skilled in the art by reference to the following specification, appended drawings and patent claims.

BRIEF DESCRIPTION OF THE DRAWINGS

1 is a perspective view of the suspension unit. FIG. 2 is an expanded view of the suspension unit, which shows all suspension's essential parts and some details of the arrangement of the suspension mechanism. FIG. 3 is another expanded view of the suspension unit, which provides some further details of the suspension mechanism.

FIG. 4 is a perspective view of the suspension unit. FIG. 5 is an expanded view of the suspension unit, which shows all suspension's essential parts and some details of the arrangement of the suspension mechanism FIG. 6 is another expanded view of the suspension unit, which provides some further details of the suspension mechanism.

FIG. 7 is a perspective view of the suspension unit. FIG. 8 is an expanded view of the suspension unit, which shows all suspension's essential parts and some details of the arrangement of the suspension mechanism. FIG. 9 is another expanded view of the suspension unit, which provides some further details of the suspension mechanism.

FIG. 10 is a perspective view of the suspension unit. FIG. 11 is an expanded view of the suspension unit, which shows all suspension's essential parts and some details of the arrangement of the suspension mechanism FIG. 12 is a perspective view of the suspension unit. FIG. 13 is an expanded view of the suspension unit, which exhibits all suspension's essential parts and all details of the arrangement of the suspension mechanism.

FIG. 14 is a perspective view of the suspension unit. FIG. 15 is an expanded view of the suspension unit, which shows all suspension's essential parts and some details of the arrangement of the specific suspension spatial mechanism. FIG. 16 is another expanded view of the suspension unit, which provides some further details of the suspension mechanism.

FIG. 17 is a perspective view of the suspension unit. FIG. 18 is an expanded view of the suspension unit, which shows all suspension's essential parts and some details of the arrangement of the suspension mechanism.

DESCRIPTION OF THE PREFFERED EMBODIMENTS

EXAMPLE 1

Figure 1:
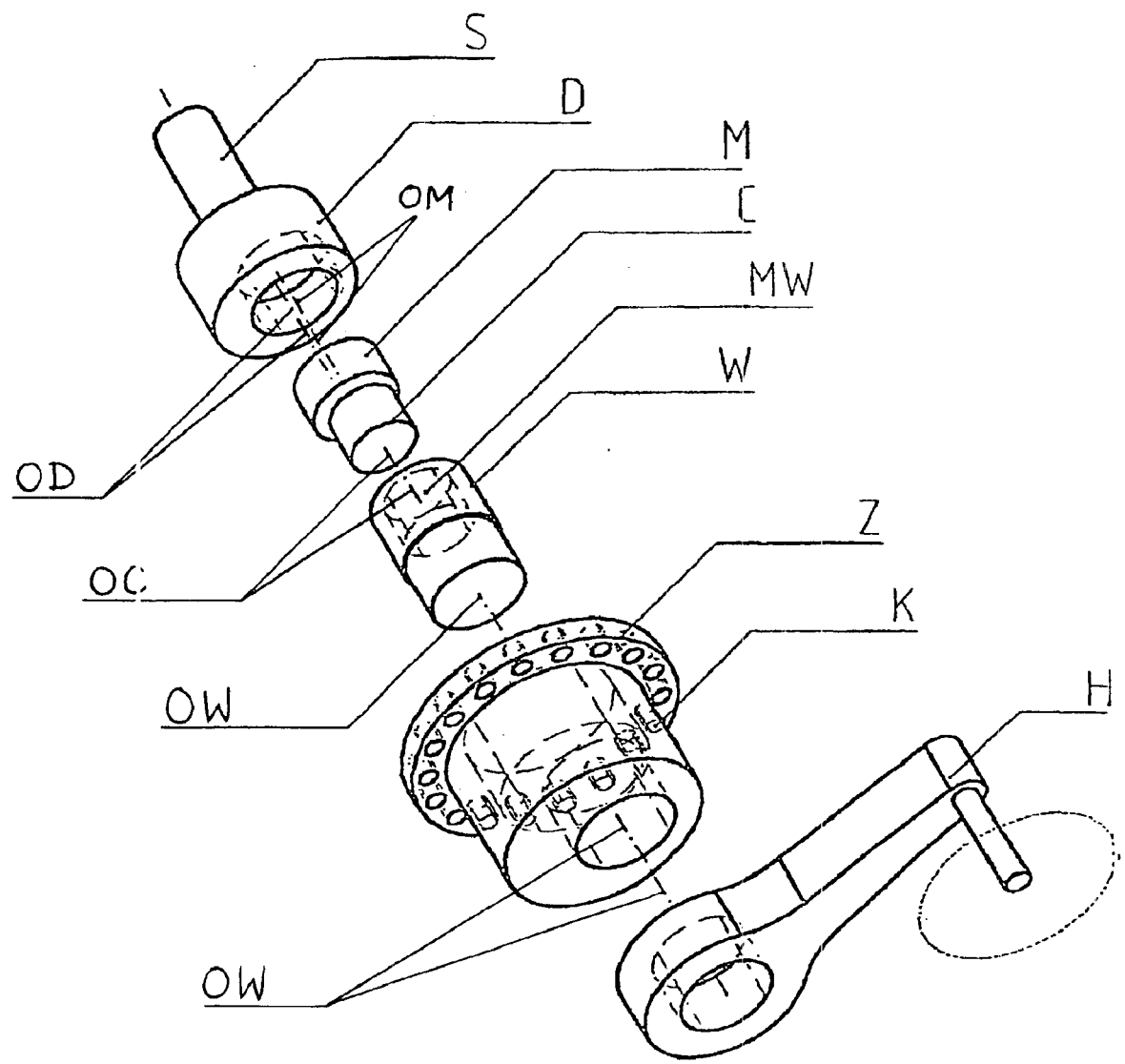
FIGS. 1–3 show a vehicle suspension unit in accordance with the present invention fitted with a torsion bar and the suspension mechanism shaft coupled with a vehicle wheel arm. This type of the suspension unit is intended for fastening to the vehicle frame through the mechanism body. FIG.
Figure 2:
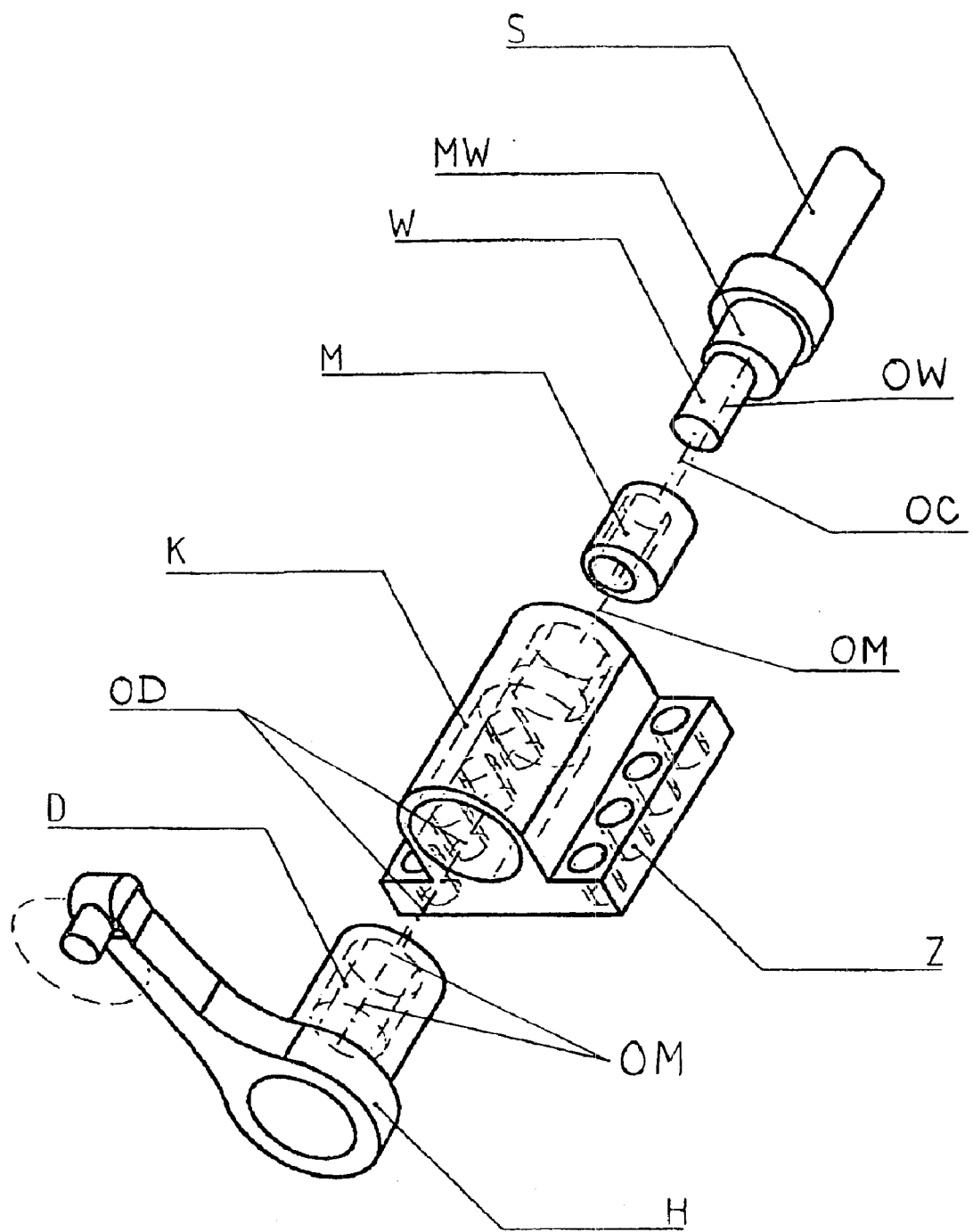
Figure 3:
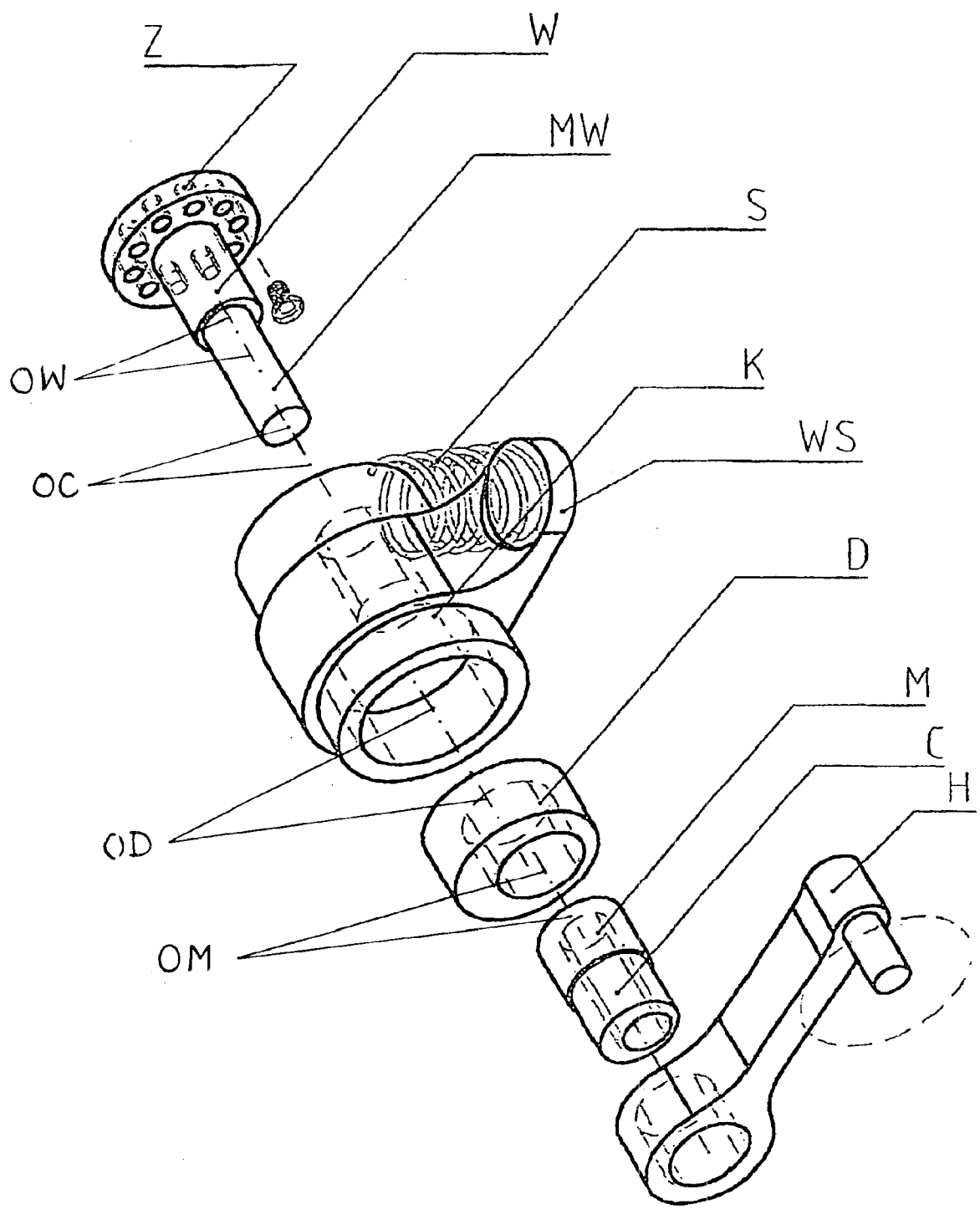

Referring to FIGS. 1–3, there is shown a suspension unit fitted with a torsion bar in accordance with the present invention.

Now, referring to FIGS. 1, 2 and 3, the four-link flat suspension mechanism comprises a shaft (W) fitted with a circular eccentric bore chamber (WM) (FIG. 3). In the eccentric bore chamber (WM) of the shaft (W) pivots a pivot (MW) of an intermediate eccentric (M), the other end of which pivots inside of an eccentric circular bore chamber (DM) of a disc (D) (FIG. 2). The shaft (W) and the disc (D) pivot directly in a body (K) in their respective circular bore chambers (KW) (FIG. 2) and (KD) (FIG. 3). The chamber (KD) is displaced relative the chamber (KW) by a suitable magnitude. An arm (H) is fastened to a pivot of the shaft (W). One end of a torsion bar (S) is coupled rigidly with the disc (D), and the other one is anchored in a vehicle frame (F). The entire suspension unit is fastened to the vehicle frame (F) with the help of a flange (Z) at the body (K) (FIG. 1).

It can be seen from FIGS. 2 and 3 that the moving parts of the suspension mechanism, namely the shaft (W), the disc (D) and the intermediate eccentric (M) fill the whole internal space (formed by the chambers (KW) and (KD)) of the mechanism body (K), thus providing the strongest four link mechanism in existence.

In this arrangement (FIGS. 2 and 3) the axis (OW) of rotation of the shaft (W) relative the body (K) (which overlaps the axis of symmetry of the circular bore chamber (KW)), the axis (OD) of rotation of the disc (D) relative the body (K) (which overlaps the axis of symmetry of the circular bore chamber (KD)), the axis (OMW) of rotation of the intermediate eccentric (M) relative the shaft (W) (which overlaps the axis of symmetry of the circular eccentric bore chamber (WM) in the shaft (W) and the axis of symmetry of the pivot (MW) of the intermediate eccentric (M))) and the axis (OMD) of rotation of the intermediate eccentric (M) relative the disc (D) (which overlaps the axis (ODM) of symmetry of the circular bore chamber (DM) in the disc (D)) are all parallel to each other and suitably distanced one from another.

Owing to said arrangement, the suspension features a strongly progressive characteristic, much better than that of the hydro-pneumatic ones. Its characteristic is differentiable in contradistinction to other progressive suspensions of jump characteristic fitted with a few in turn actuating steel springs.

The suspension gives the possibility to choose freely the suspension damping characteristic, including its progressiveness, through the selection of geometric parameters of its mechanism, which is a major advantage over known suspensions including hydropneumatic ones whose characteristic is determined by thermodynamic parameters of the gas being used.

The suspension features a combination of small deformations of the spring with large wheel flex, which lengthens spring's life. Moreover the suspension forms a compact closed unit, which can be filled with a lubricant for the whole period of operation of said suspension.

There is a suspension with spatial mechanism in accordance with the present invention, which is a full analog of the present suspension.

EXAMPLE 2

Figure 4:
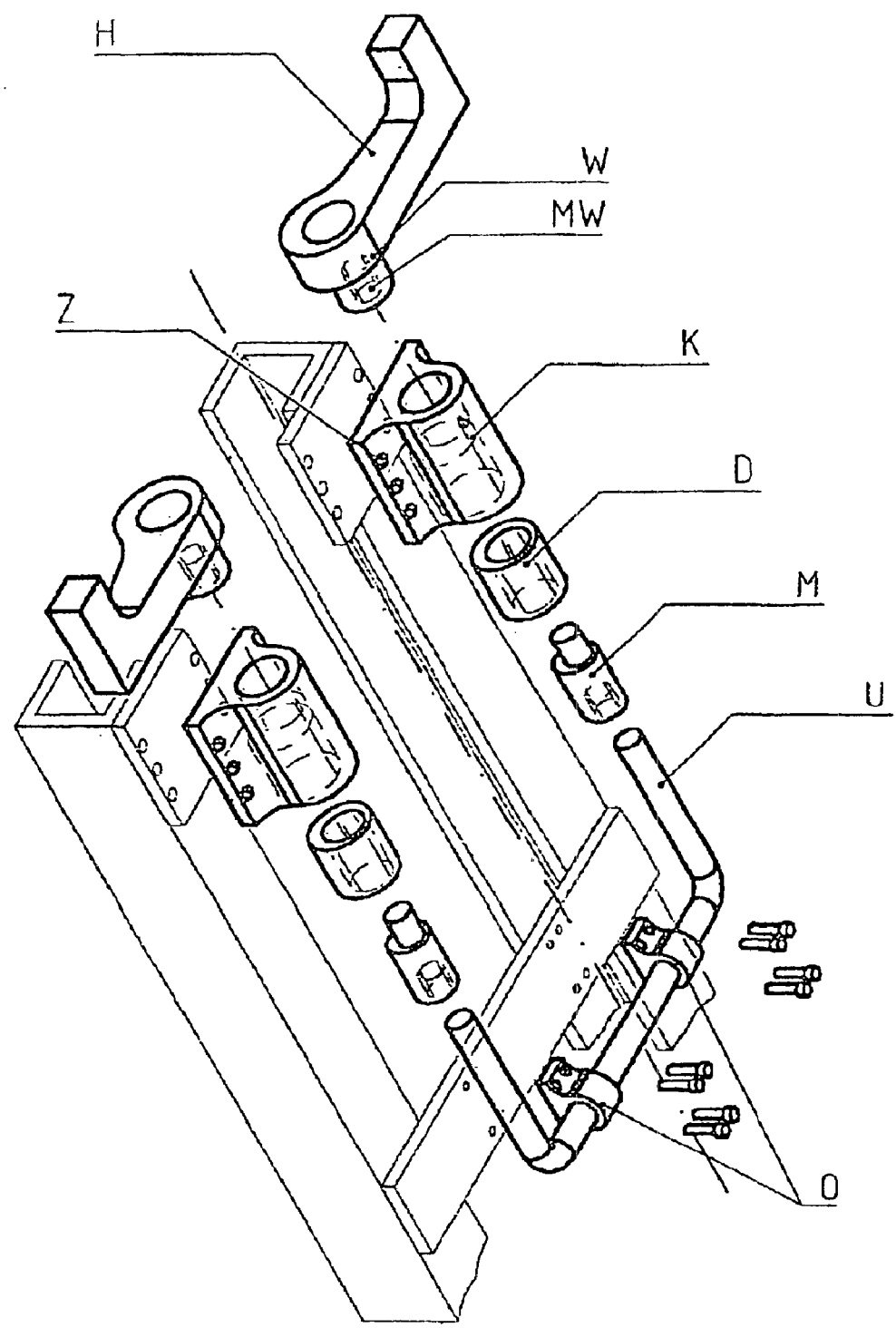
FIGS. 4–6 show a vehicle suspension unit in accordance with the present invention fitted with a torsion bar and the suspension mechanism's disc coupled with a wheel arm. This type of the suspension is fit for fastening to a vehicle body through the mechanism body.
Figure 5:
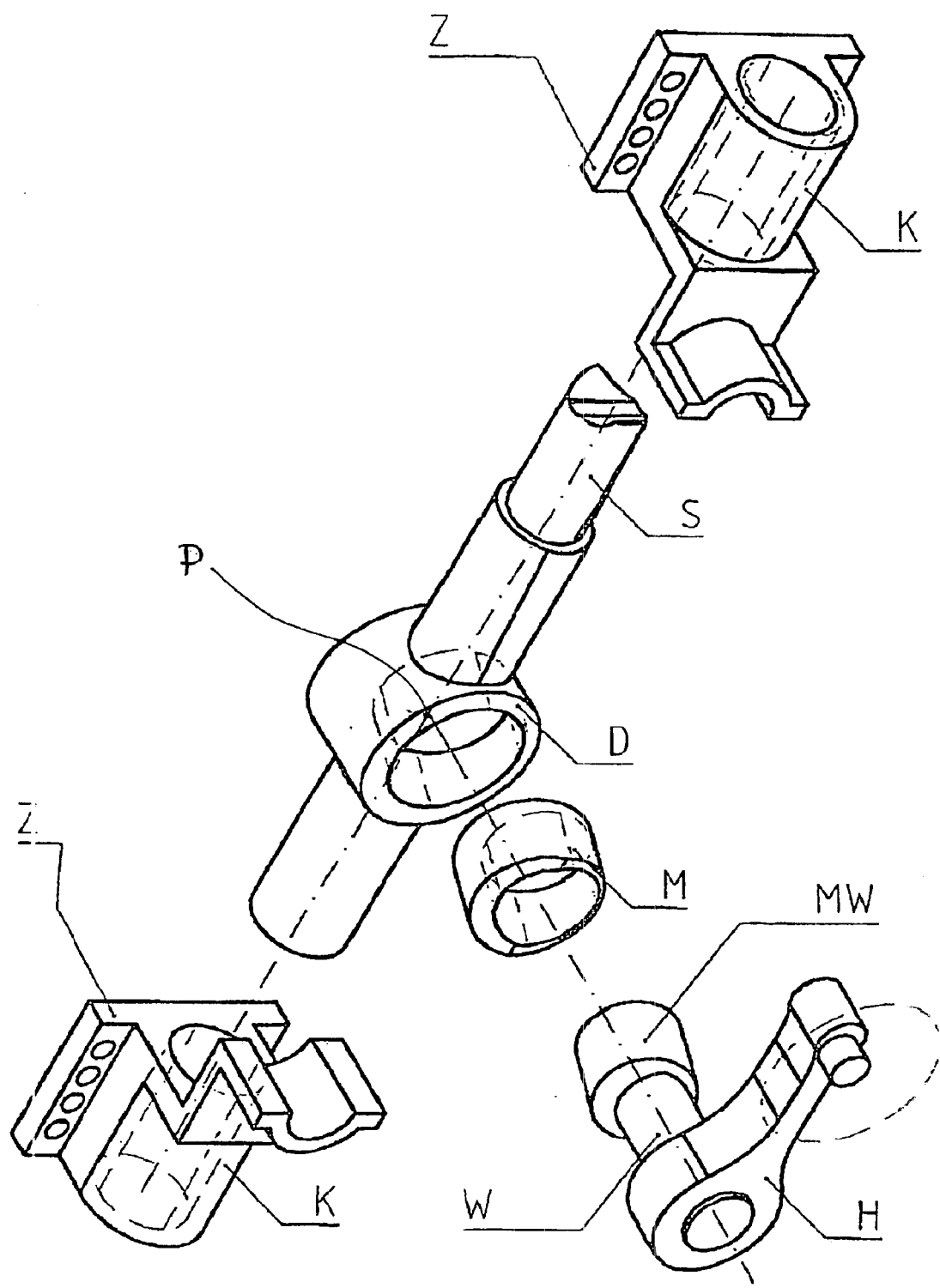
Figure 6:
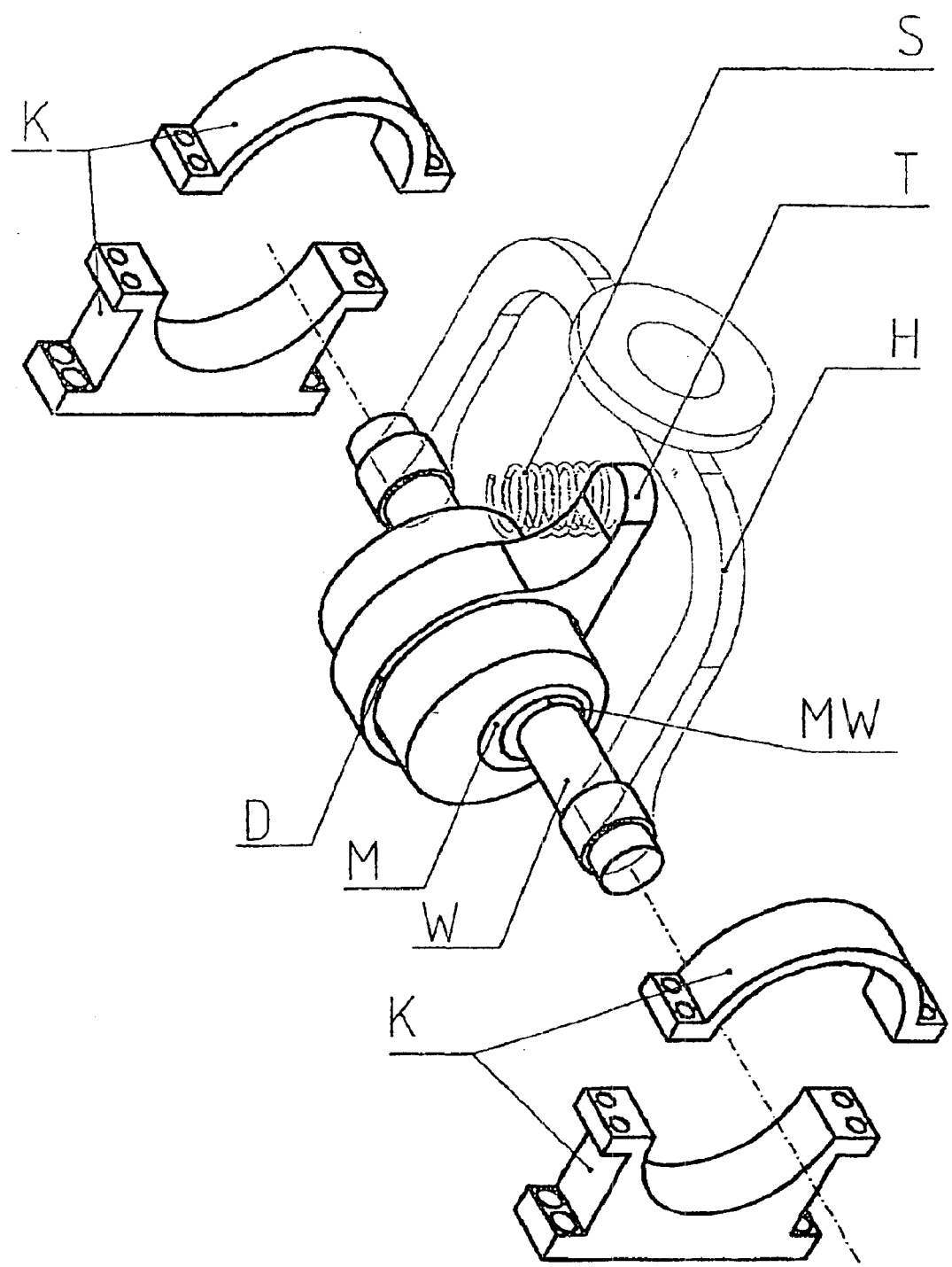

Referring to FIGS. 4–6 there is shown another suspension unit fitted with a torsion bar in accordance with the present invention.

The suspension mechanism (FIGS. 5 and 6) comprises a shaft (W) fitted with an eccentric (WM), said eccentric (WM) being pivoted in an eccentric bore chamber (MW) of an intermediate eccentric (M), whereas the eccentric (M) pivots inside of an eccentric bore chamber (DM) in a disc (D). The shaft (W) and the disc (D) pivot directly in a body (K) in their respective circular bore chambers (KW) and (KD).

One end of a torsion bar (S) is coupled rigidly with the shaft (W) and the other end of torsion bar (S) is anchored in a vehicle frame (F). A trailing arm (H) is coupled with the disc (D). The whole suspension unit is fixed to the vehicle frame (F) with the help of a flange (Z) at the body (K).

In this arrangement the axis (OW) of rotation of the shaft (W) relative the body (K) (which overlaps the symmetry axis of the circular bore chamber (KW)), the axis (OD) of rotation of the disc (D) relative the body (K) (which overlaps the axis of symmetry of the circular bore chamber (KD)), the symmetry axis (OWM) of the eccentric (WM) at the shaft (W) (which overlaps the axis (OMW) of rotation of the intermediate eccentric (M) relative the shaft (W)), and the axis (OMD) of rotation of the intermediate eccentric (M) relative the disc (D) (which overlaps the symmetry axis (ODM) of the circular bore chamber (DM) in the disc (D)) are all parallel to each other and suitably distanced one from another.

The suspension features a very strongly progressive characteristic since to a relatively small vehicle wheel flex (and therefore small angle of rotation of the disc (D)) there corresponds a relatively large angle of rotation of the shaft (W), and hence a large torsion of the torsion bar, in contradistinction to the suspension described in Example 1.

During overhauls, a suspension may be assembled in existing vehicles e.g. in tanks.

There is a suspension with spatial mechanism in accordance with the present invention, which is a full analog of the present suspension.

EXAMPLE 3

Figure 7:
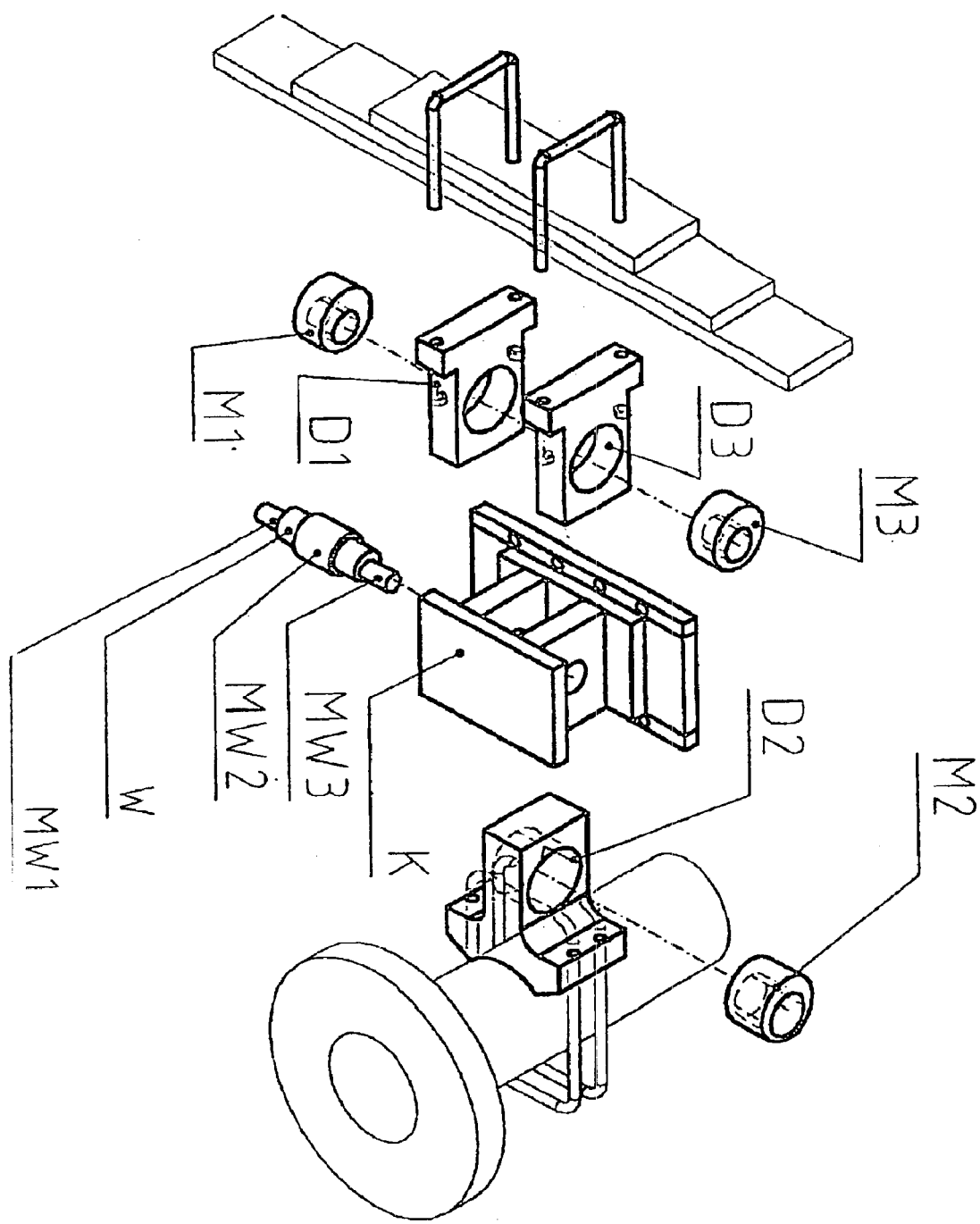
FIGS. 7–9 show a vehicle suspension unit fitted with a coil spring and the suspension mechanism's intermediate eccentric coupled with the wheel's arm. This type of the suspension is fit for fastening to vehicle's frame through a flange on the shaft, and one end of the spring is coupled with the suspension mechanism body, while the other one is supported in the vehicle frame.
Figure 8:
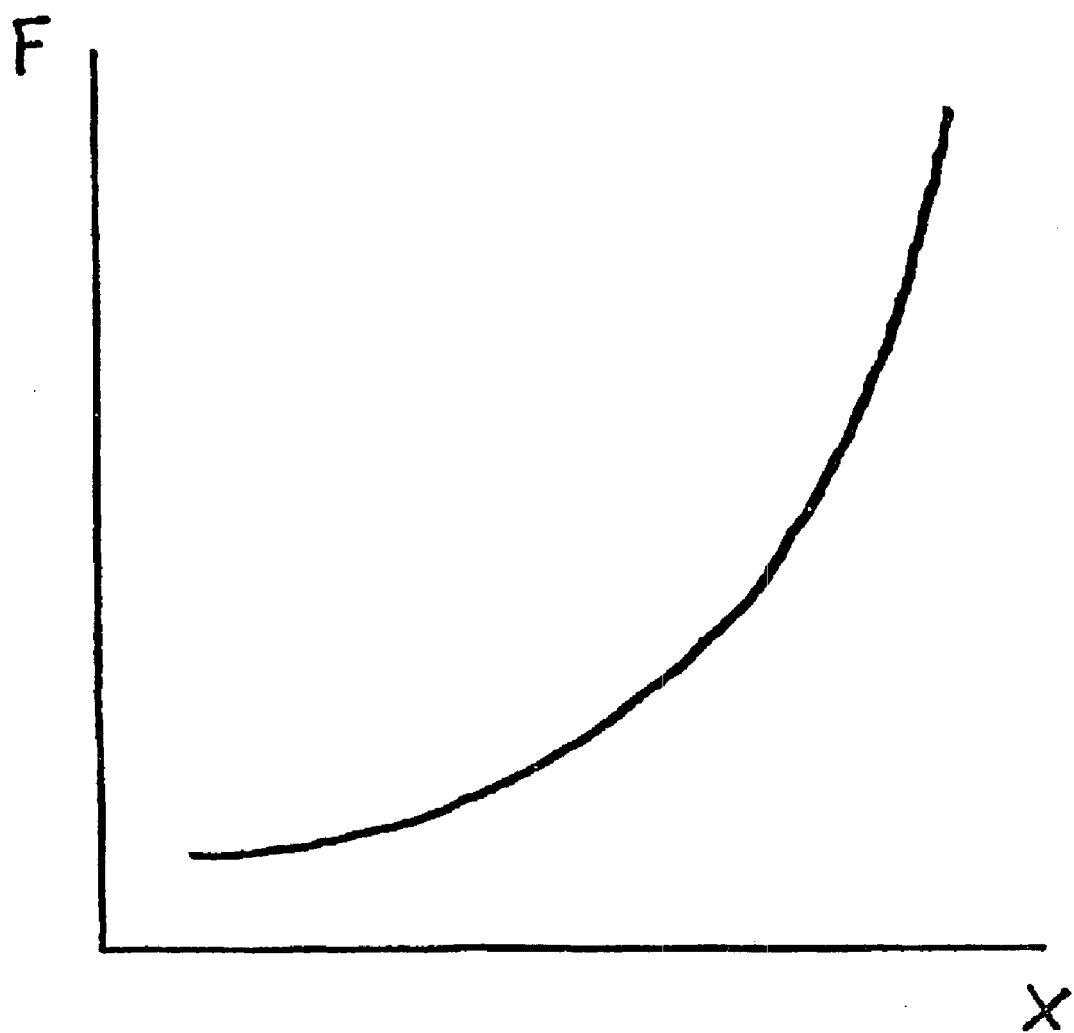
Figure 9:
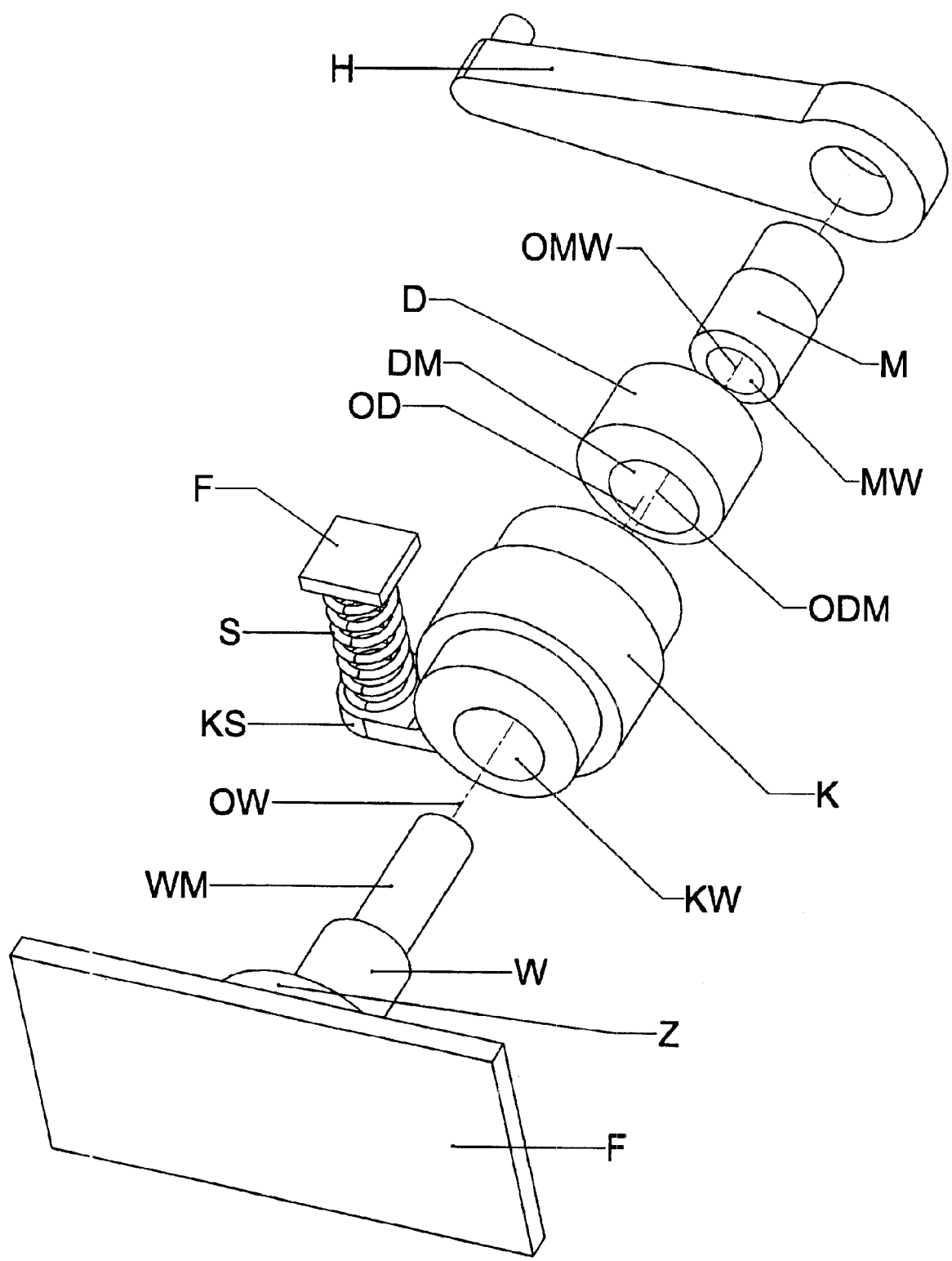

Referring to FIGS. 7–9, there is shown a suspension system fitted with a coil spring and a trailing arm in accordance with the present invention.

The suspension mechanism (FIGS. 8 and 9) comprises a shaft (W) fitted with an eccentric (WM), wherein the eccentric (WM) pivots in an eccentric circular bore chamber (MW) in an intermediate eccentric (M), and the intermediate eccentric (M) pivots inside of an eccentric circular bore chamber (DM) in the disc (D). The disc (D) pivots in a circular bore chamber (KD) placed directly in a body (K), and the body (K) is coupled rotationally with the shaft (W) through a circular bore chamber (KW).

An arm (H) is fastened to the intermediate eccentric (M). The body (K) is fitted with a bracket (KS), on which one end of a coil spring (S) is being supported, the other end of which rests on a vehicle frame (F). The whole suspension unit is fastened to the vehicle frame (F) with the help of a flange (Z) at the shaft (W).

In this arrangement the axis (OW) of rotation of the shaft (W) relative the body (K) (which overlaps the axis of symmetry of the circular bore chamber (KW)), the axis (OD) of rotation of the disc (D) relative the body (K) (which overlaps the symmetry axis of the circular bore chamber (KD)), the axis (OMW) of rotation of the intermediate eccentric (M) relative the shaft (W) (which overlaps the symmetry axis (OWM) of the eccentric (WM) on the shaft (W)), and the axis (OMD) of rotation of the intermediate eccentric (M) relative the disc (D) (which overlaps the symmetry axis (ODM) of the circular bore chamber (DM) in the disc (D)) are all parallel to each other and suitably distanced one from another.

The described suspension arrangement (in particular the mounting to vehicle's frame) makes it easier to use a coil spring, which is the most widespread kind of steel springs. The suspension may be assembled in existing vehicles, e.g. in tanks, during overhauls. Another important advantage of the present suspension is that it is an external suspension, i.e. the suspension unit, including the spring, is placed entirely outside the vehicle.

There is a suspension with spatial mechanism in accordance with the present invention, which is a full analog of the present suspension.

It is to be noted that all the suspension units described in the examples 1–3 can be also combined with a transverse arm (then a longitudinal torsion bar is to be applied in the examples 1 and 2) or solid axle.

EXAMPLE 4

Figure 10:
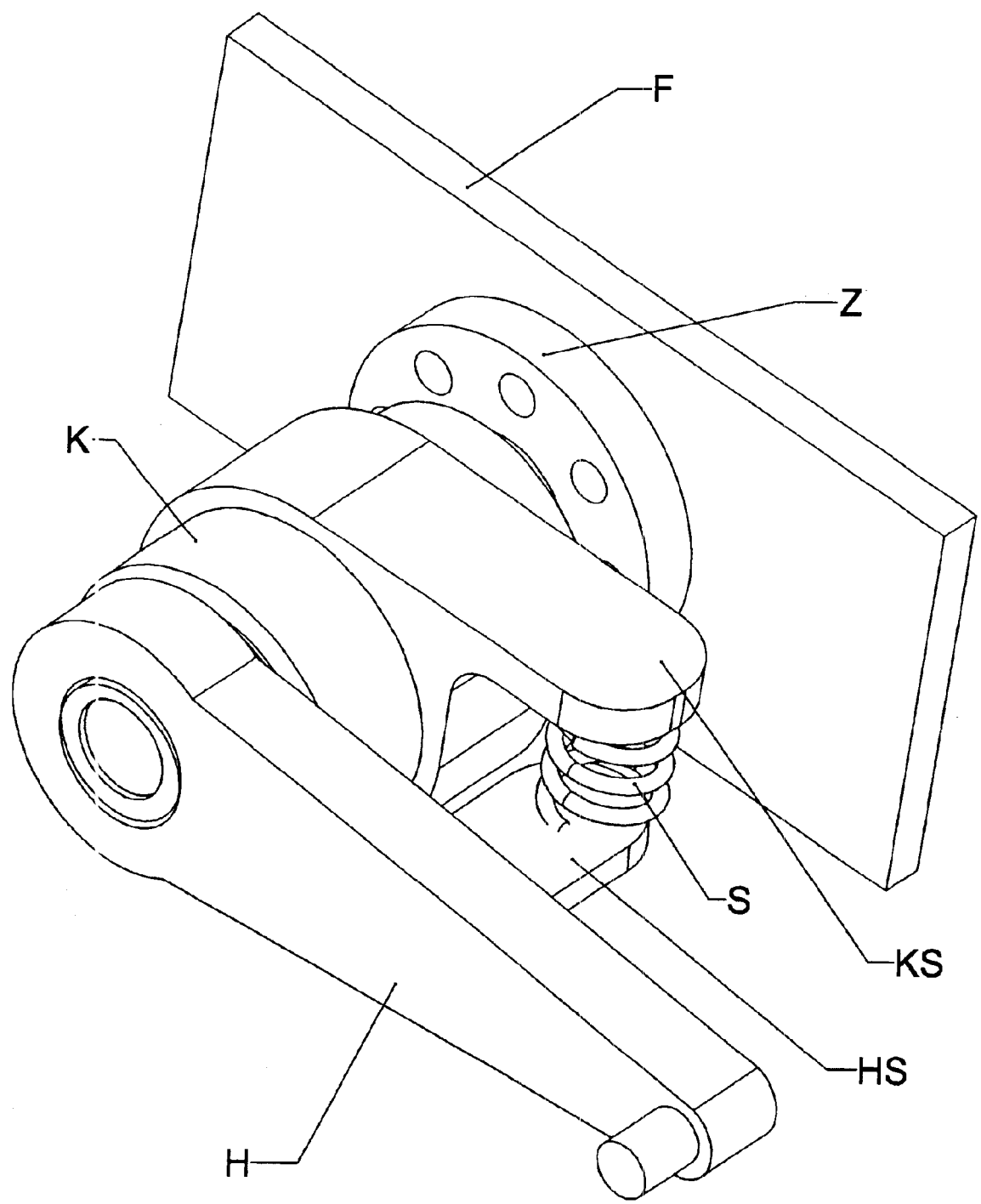
FIGS. 10, 11 show a vehicle suspension unit, which is just a variant of the unit shown in FIGS. 7–9, in which the spring is compressed by the suspension mechanism's body and a road wheel arm. Thus the suspension unit is fitted with a coil spring and the suspension mechanism's intermediate eccentric coupled with the wheel's arm. This type of the suspension is fit for fastening to vehicle's frame through a flange on the shaft, and one end of the spring is coupled with the suspension mechanism body, while the other one is coupled with the vehicle road wheel arm.
Figure 11:
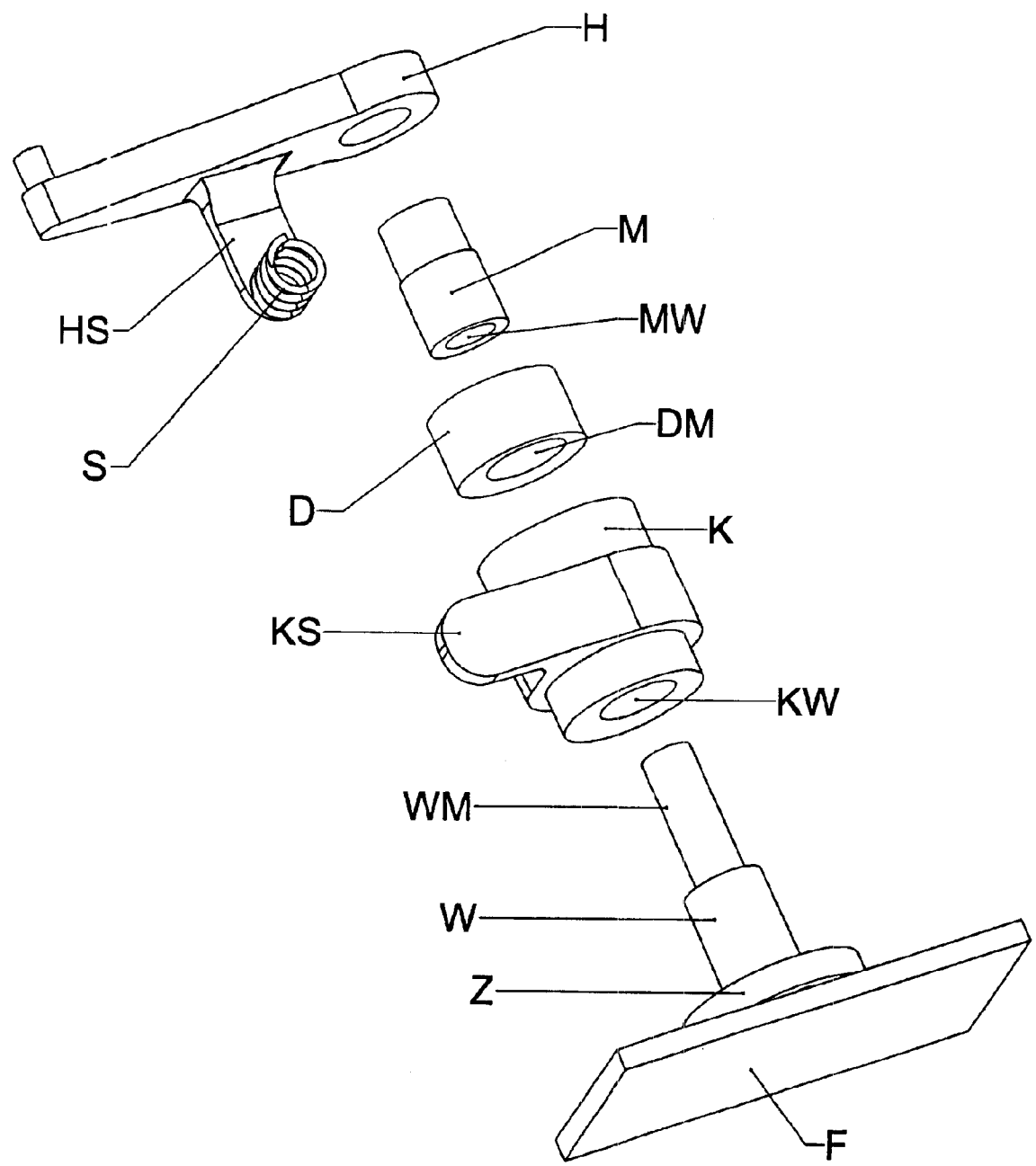

Referring to FIGS. 10, 11, there is shown a vehicle suspension unit, which is just a variant of the unit shown in FIGS. 7–9, in which the spring is compressed by two different links of the suspension mechanism (through brackets fastened to the suspension mechanism's body and a road wheel arm, which in turn is fastened to the mechanism shaft).

Thus the suspension mechanism (FIG. 11, see also FIGS. 8, 9) comprises a shaft (W) fitted with an eccentric (WM), wherein the eccentric (WM) pivots in an eccentric circular bore chamber (MW) in an intermediate eccentric (M), and the intermediate eccentric (M) pivots inside an eccentric circular bore chamber (DM) in the disc (D). The disc (D) pivots in a circular bore chamber (KD) (FIG. 8) placed directly in a body (K), which in turn is coupled rotationally with the shaft (W) through a circular bore chamber (KW).

A trailing arm (H), fitted with a bracket (HS), is coupled rigidly with the intermediate eccentric (M). The body (K) is fitted with a bracket (KS) supporting one end of a coil spring (S), the other end of which is supported by the bracket (HS) on the wheel arm (H). The entire suspension is fixed to the vehicle frame (F) through a flange (Z) at the shaft (W).

Geometry of the suspension mechanism is similar to that of the suspension mechanism described as Example 3 (FIGS. 8, 9). Thus in this arrangement the axis of rotation of the shaft (W) relative the body (K) (which overlaps the axis of symmetry of the circular bore chamber (KW)), the axis of rotation of the disc (D) relative the body (K) (which overlaps the symmetry axis of the circular bore chamber (KD)), the axis of rotation of the intermediate eccentric (M) relative the shaft (W) (which overlaps the symmetry axis of the eccentric (WM) on the shaft (W)), and the axis of rotation of the intermediate eccentric (M) relative the disc (D) (which overlaps the symmetry axis of the circular bore chamber (DM) in the disc (D)) are all parallel to each other and suitably distanced one from another.

The principal advantage of this peculiar arrangement (namely a spring being compressed by two different links of the suspension mechanism) of the suspension unit over the previous ones is that the loads of the suspension mechanism can be substantially diminished (reaction force of suspensions being equal), and therefore the suspension unit can be made smaller and lighter.

There is a suspension with spatial mechanism in accordance with the present invention, which is a full analog of the present suspension.

EXAMPLE 5

Figure 12:
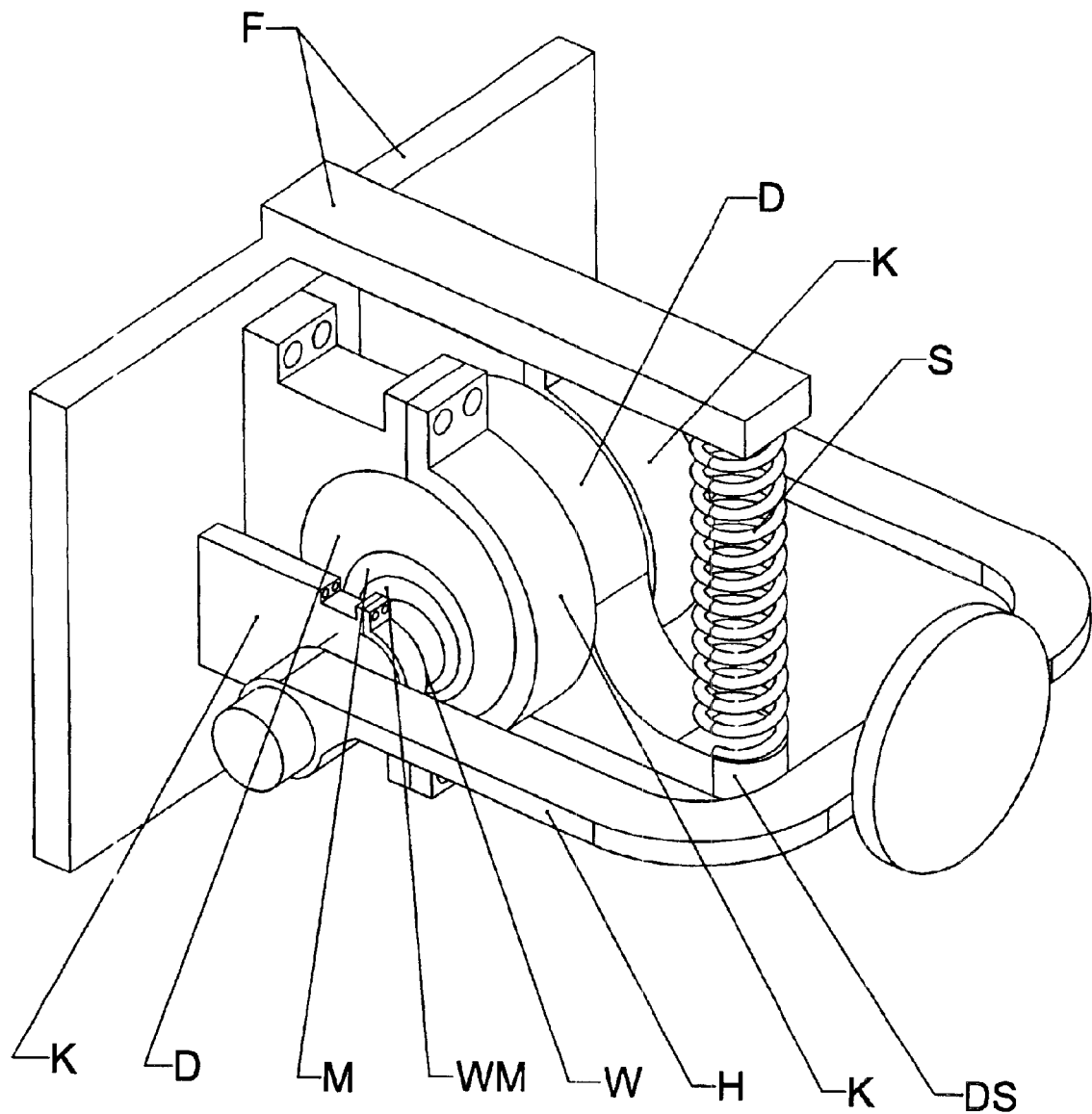
FIGS. 12, 13 show a vehicle suspension unit of the Mc Pherson type in accordance with the present invention.
Figure 13:
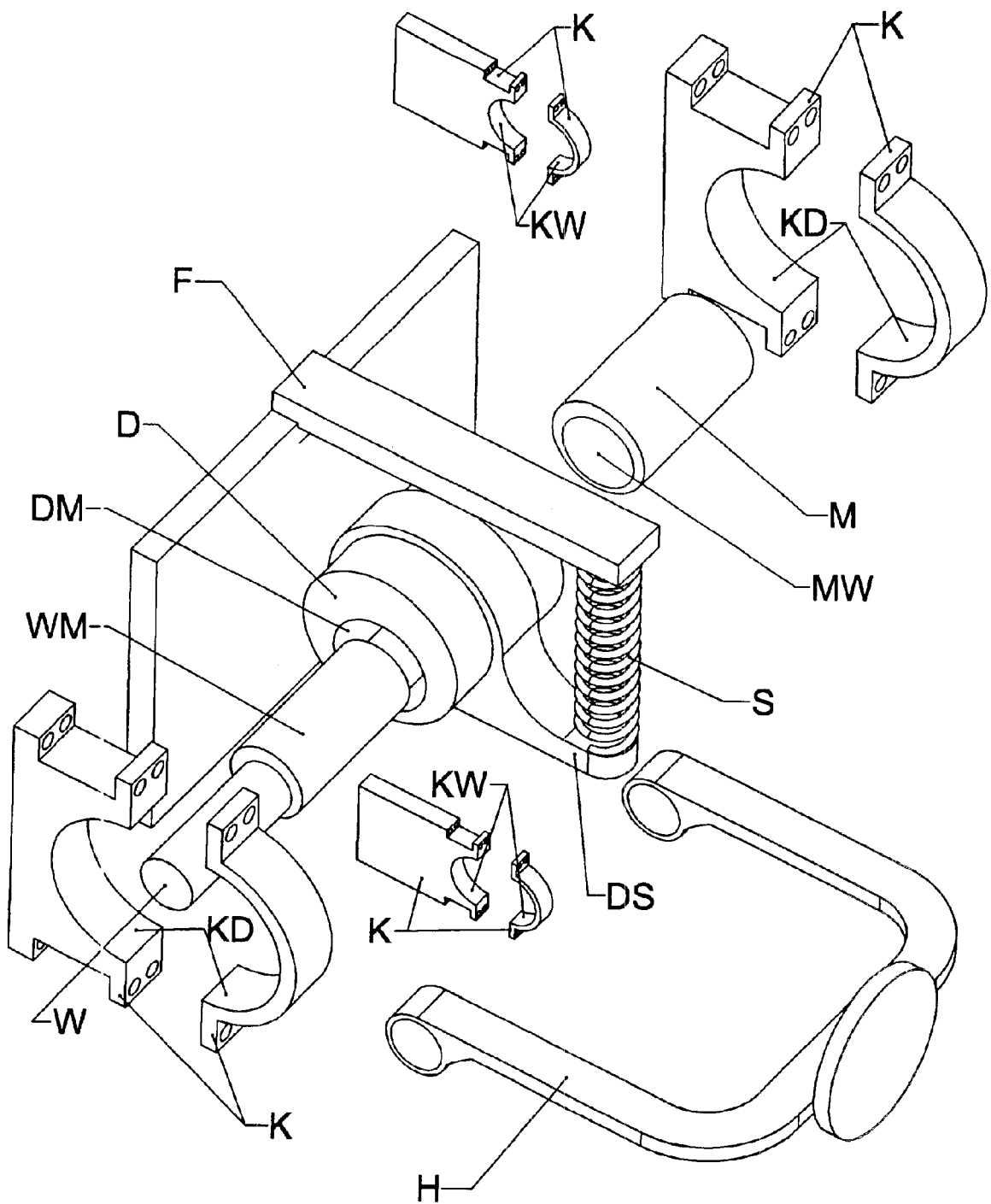

Referring to FIGS. 12 and 13, there is shown a suspension system of the McPherson type in accordance with the invention. The suspension mechanism comprises a shaft (W) fitted with an eccentric (WM), an intermediate eccentric (M), a disc (D) and a body (K), which for "assemble/disassemble" reasons is composed of eight separate pieces (which, from the kinetic point of view, form a unique link of the mechanism). The shaft (W) and the disc (D) pivot directly in the body (K) in their respective bearings (KW) and (KD), while the eccentric (WM) on the shaft (W) pivots in a circular eccentric bore chamber (MW) in the intermediate eccentric (M), and the intermediate eccentric (M) pivots in a circular eccentric bore chamber (DM) in the disc (D).

A radius arm (H) is fastened to the shaft (W), and a bracket (DS) supporting one end of a coil spring (S) is fastened to the disc (D). The other end of the coil spring (S) is supported in a vehicle frame (F), and the whole suspension unit is fastened to the frame (F) through the body (K).

Kinetics of the suspension mechanism is precisely the same as that of the mechanisms of the previous suspension units. In particular the axes of rotation of all the kinetic pairs of the suspension mechanism are parallel to each other.

The suspension has a non-linear progressive characteristic and compact structure, typical for suspensions of the McPherson type.

EXAMPLE 6

Figure 14:
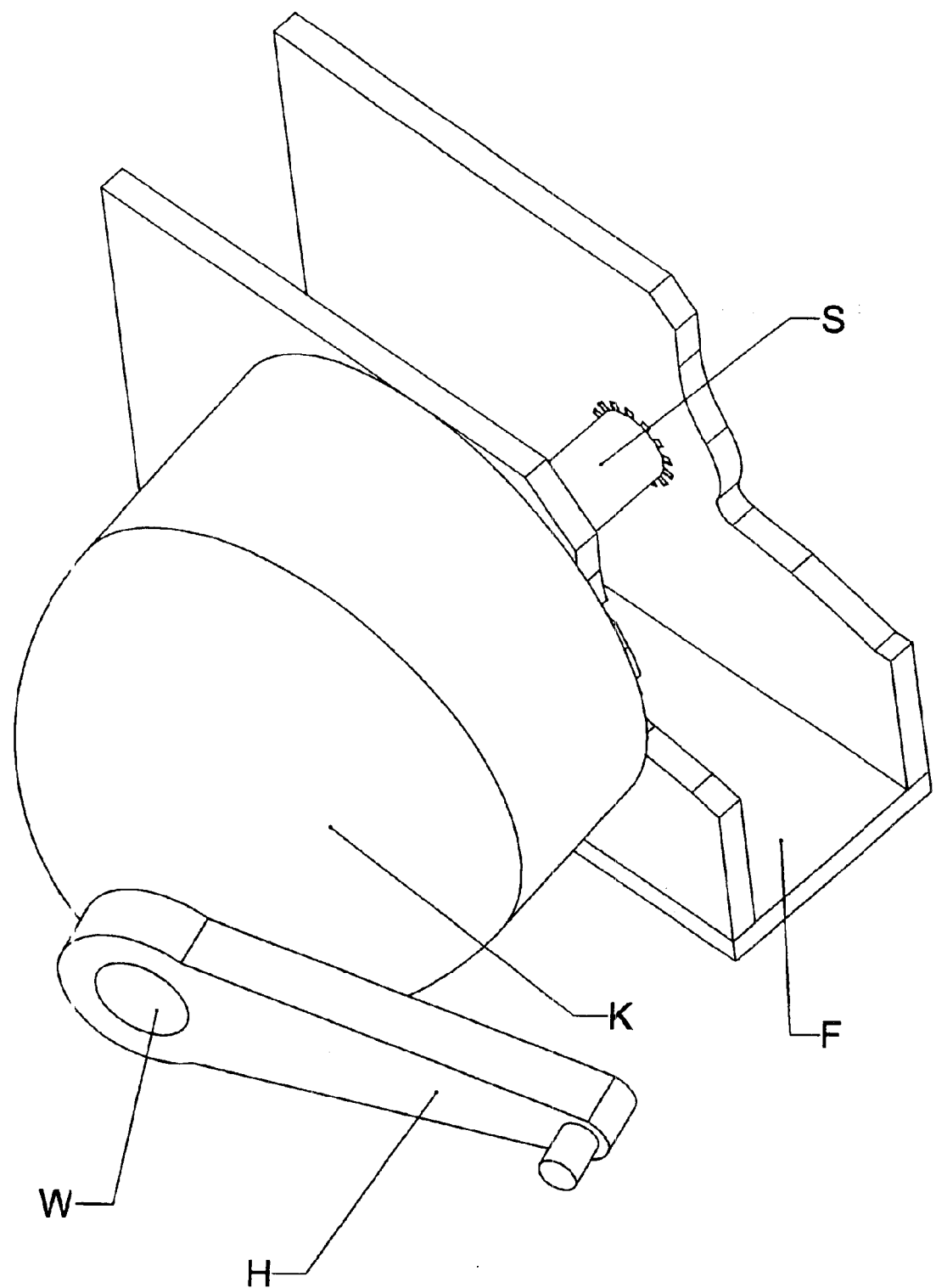
FIGS. 14–16 show an analog of the suspension unit illustrated in FIGS. 1–3, which uses a spatial mechanism of the type described above. Thus the suspension unit is fitted with a torsion bar and the suspension mechanism shaft coupled with a vehicle wheel arm. This type of the suspension unit is intended for fastening to the vehicle frame through the mechanism body.
Figure 15:
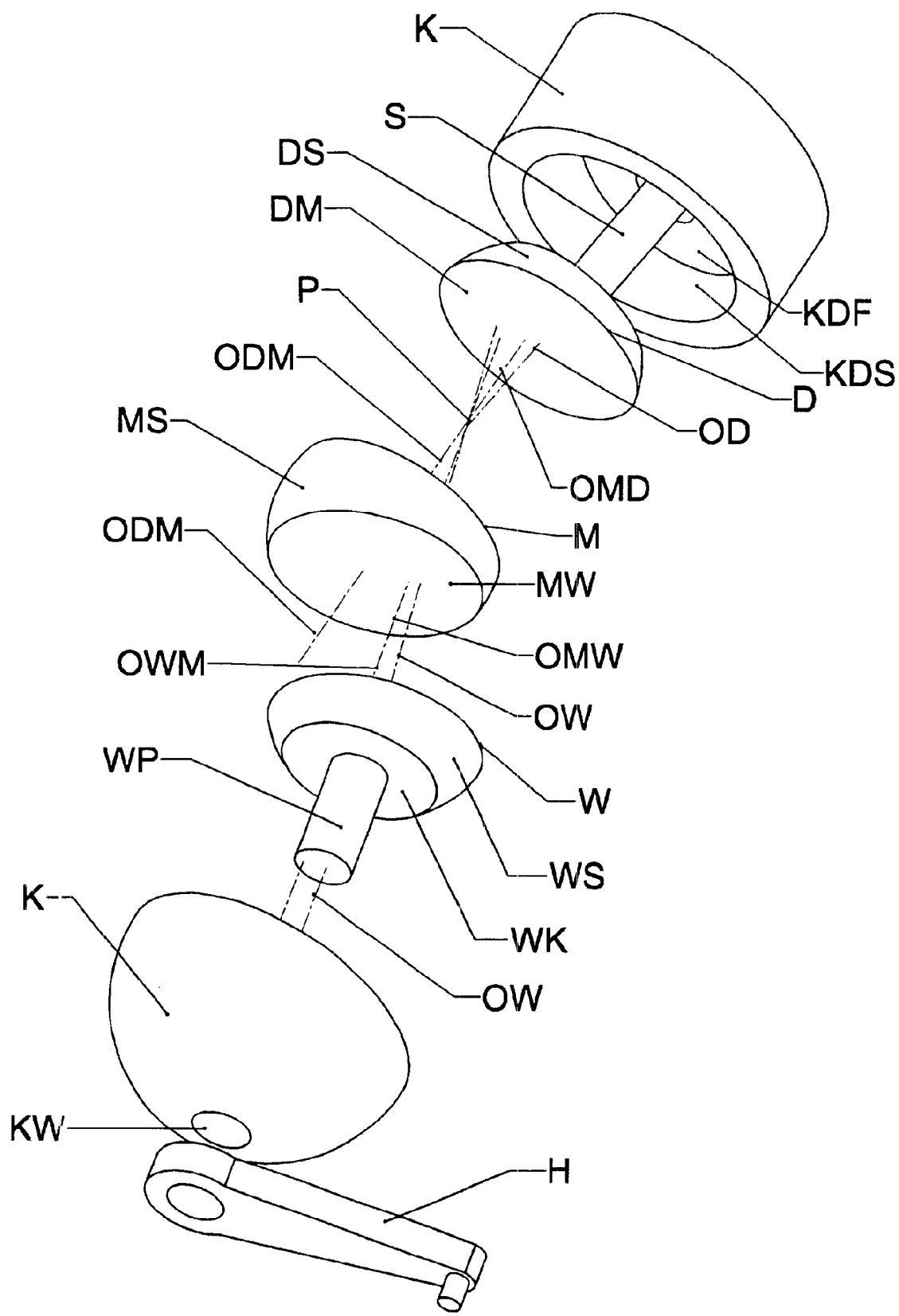
Figure 16:
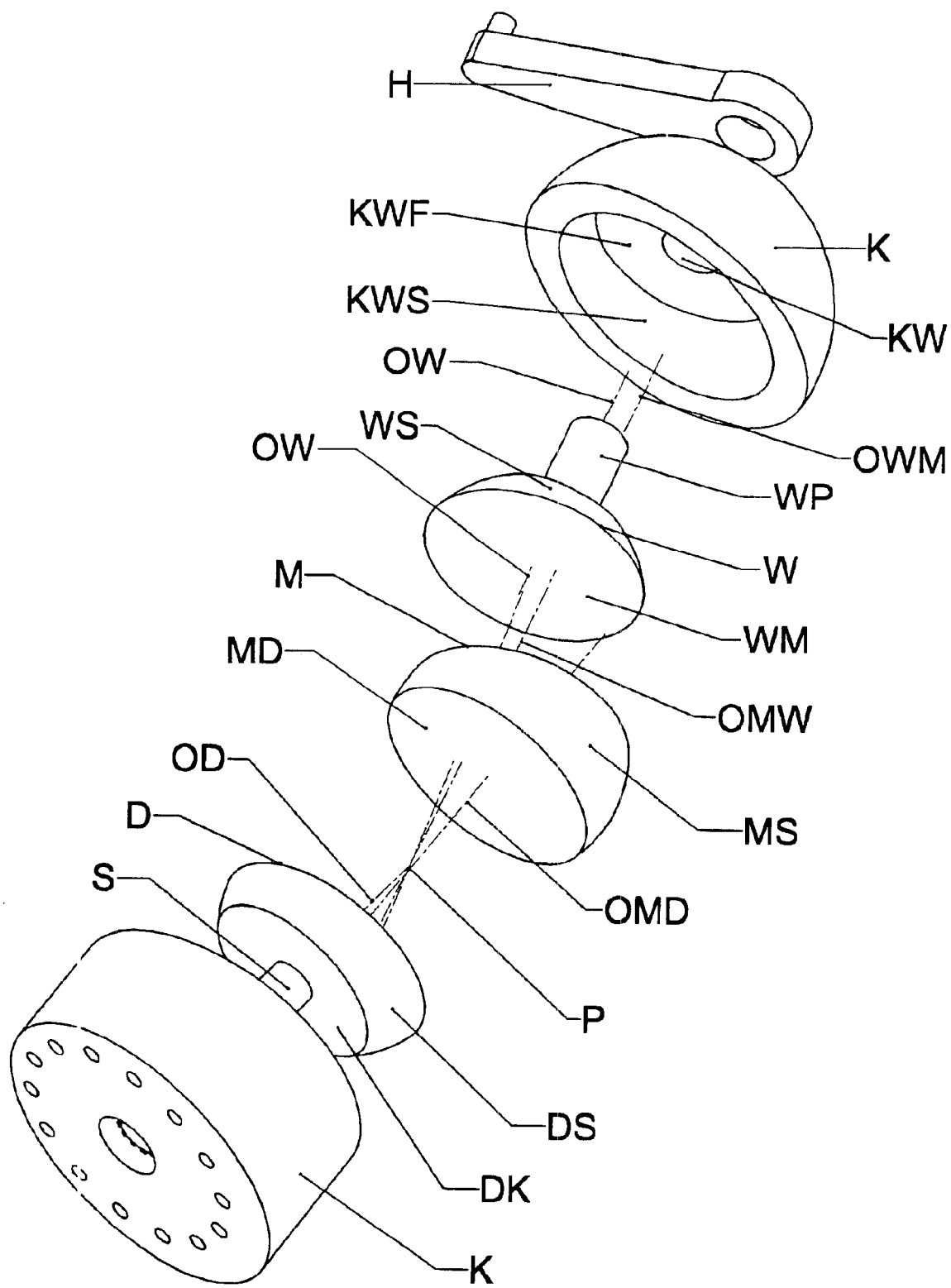

Referring to FIGS. 14–16, there is shown a suspension unit according to the present invention, which is a full "spatial" analog of the suspension described in Example 1. More precisely, the suspension unit has a spatial mechanism as described in Summary of the Invention, and is fitted with a torsion spring.

The suspension mechanism (FIGS. 15 and 16) has four links named shaft (W), disc (D), intermediate eccentric (M), and body (K), which for "assembling" reasons is made in two parts. The shaft (W), the disc (D) and the intermediate eccentric (M) all assume the general form of spatial eccentric. The shaft (W) has a pin (WP), a spherical surface (WS), and two flat surfaces (WK) and (WM). The disc (D) has a spherical surface (DS) and two flat surfaces (DK) and (DM). The intermediate eccentric (M) has a spherical surface (MS) and two flat surfaces (MW) and (MD). Placed in the body (K) there are two hemispherical bore chambers (KWS) and (KDS) with their respective flat surfaces (KWF) and (KWD). Both the hemispherical bore chambers (KWS) and (KDS) form a spherical bore chamber placed inside of the body (K). Moreover, placed in the body (K) there is a bearing (KW) supporting the pin (WP) on the shaft (W).

The shaft (W) pivots in the hemispherical bore chamber (KWS), and the spherical surface (WS) of the shaft (W) slides over the spherical surface of the bore chamber (KWS), while the flat surface (WK) slides over the flat surface (KWF), and the pin (WP) of the shaft (W) pivots in the bearing (KW). Thanks to the presence of the flat surflce (WK) on the shaft (W) mating the flat surface (KWF) of the bore chamber (KWS), the shaft (W) and the body (K) form a higher (rotational) kinetic couple. The axis (OW) of rotation of the shaft (W) relative the body (K) is perpendicular to both the flat surfaces (WK) and (KWF).

Similarly, the disc (D) pivots in the hemispherical bore chamber (KDS), and the spherical surface (DS) of the disc (D) slides over the spherical surface of the bore chamber (KDS), while the flat surface (DK) slides over the flat surface (KDF). Thanks to the presence of the flat surface (DK) on the disc (K) mating the flat surface (KDF) of the bore chamber (KDS), the disc (D) and the body (K) form a higher (rotational) kinetic couple. The axis (OD) of rotation of the disc (D) relative the body (K) is perpendicular to both the flat surfaces (DK) and (KDF).

The intermediate eccentric (M) is placed between the shaft (W) and the disc (1)), and the flat surface (MW) of the intermediate eccentric (M) mates the flat surface (WM) of the shaft (W), while the flat surface (MD) of the intermediate eccentric (M) mates the flat surface (DM) of the disc (D).

Moreover, the spherical surface (MS) of the intermediate eccentric (M) slides over the spherical surface of the spherical bore chamber inside the body (K) formed by the two hemispherical bore chambers (KWS) and (KDS). The intermediate eccentric (M) and the shaft (W) form a higher (rotational) kinetic couple, and the axis (OMW) of rotation of the intermediate eccentric (M) relative the shaft (W) and the overlapping axis (OWM) of rotation of the shaft (W) relative the eccentric (M) are both perpendicular to both the flat surfaces (MW) and (WM). The intermediate eccentric (M) and the disc (D) form a higher (rotational) kinetic couple, and the axis (OMD) of rotation of the intermediate eccentric (M) relative the disc (D) and the overlapping axis (ODM) of rotation of the disc (D) relative the eccentric (M) are both perpendicular to both the flat surfaces (MD) and (DM).

All the axes (OW), (OD), (ODM) (and the overlapping axis (OMD)) and (OWM (and the overlapping axis (OMW)) intersect at precisely one point (P), and any of the axes (OW), (OD), (ODM) and (OWM) is inclined relative any other of the axes at a non-zero angle.

There is a trailing arm (H) fastened to the shaft (W) through the pin (WP). There is also a torsion spring (S), one end of which is fastened to the disc (D), while the other end of said spring (S) is anchored in a vehicle frame (F). The whole suspension unit is fastened to the vehicle frame (F) through the body (K).

The principal advantage of the present suspension unit over all the suspensions disclosed as examples 1–5 (using flat mechanisms) is much more compact and robust structure. In fact, maximum specific loads of mechanism's components (in particular bearings) being equal, spherical mechanism of the type described above is much more compact than its flat counterpart as described in examples 1–5 (which is the strongest flat mechanism in existence). Another important advantage of the present suspension unit is that it enables the position of the spring relative the road wheel arm to be freely chosen. In particular it enables a longitudinal torsion spring to be combined with a trailing arm.

EXAMPLE 7

Figure 17:
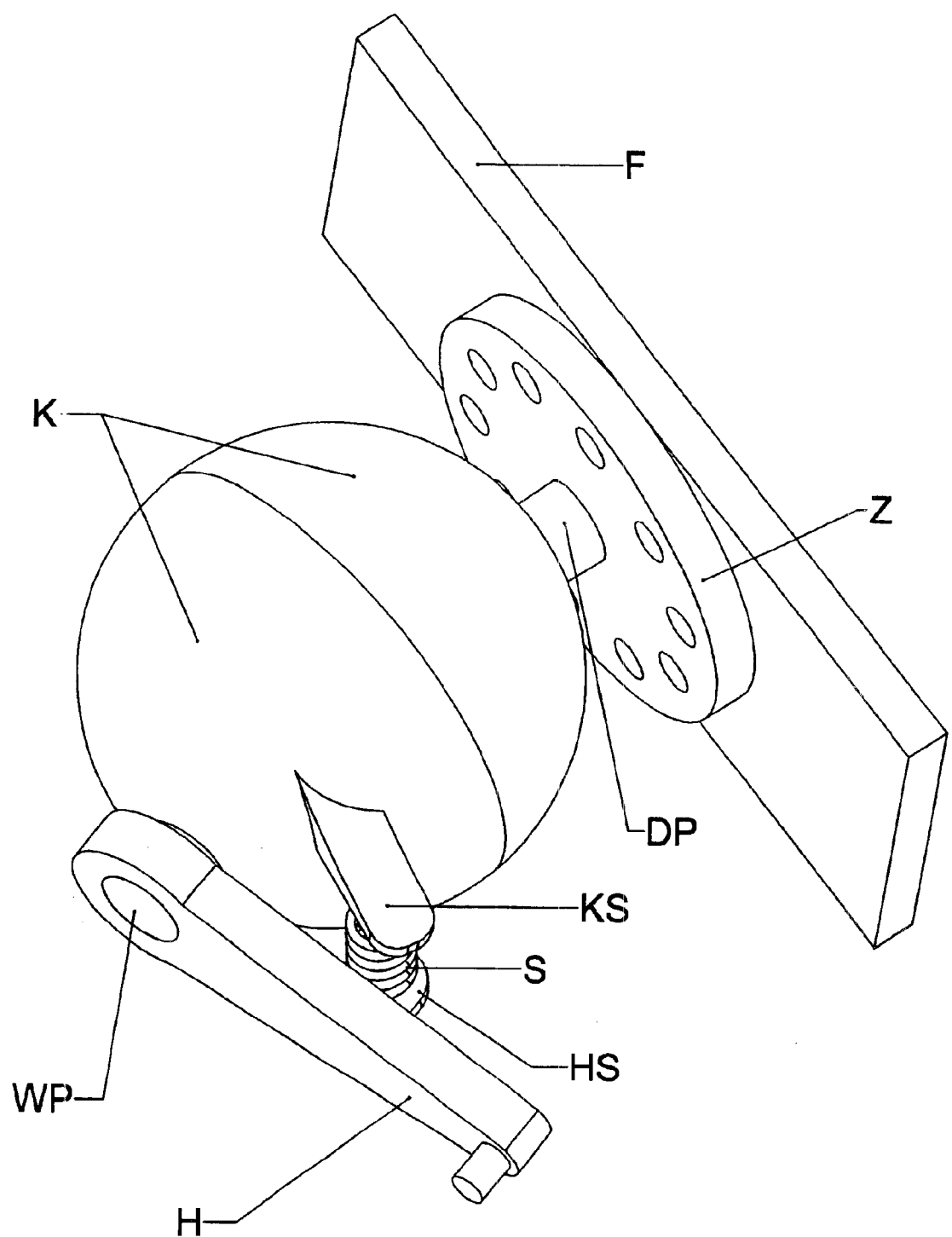
FIGS. 17 and 18 show an analog of the suspension unit illustrated in FIGS. 10, 11, which uses a spatial mechanism of the type described above. Thus the vehicle suspension unit is fitted with a coil spring and the suspension mechanism's shaft coupled with the wheel's arm. This type of the suspension is fit for fastening to vehicle's frame through a flange on the mechanism disc, and one end of the spring is coupled with the suspension mechanism body, while the other one is coupled with the vehicle wheel arm.
Figure 18:
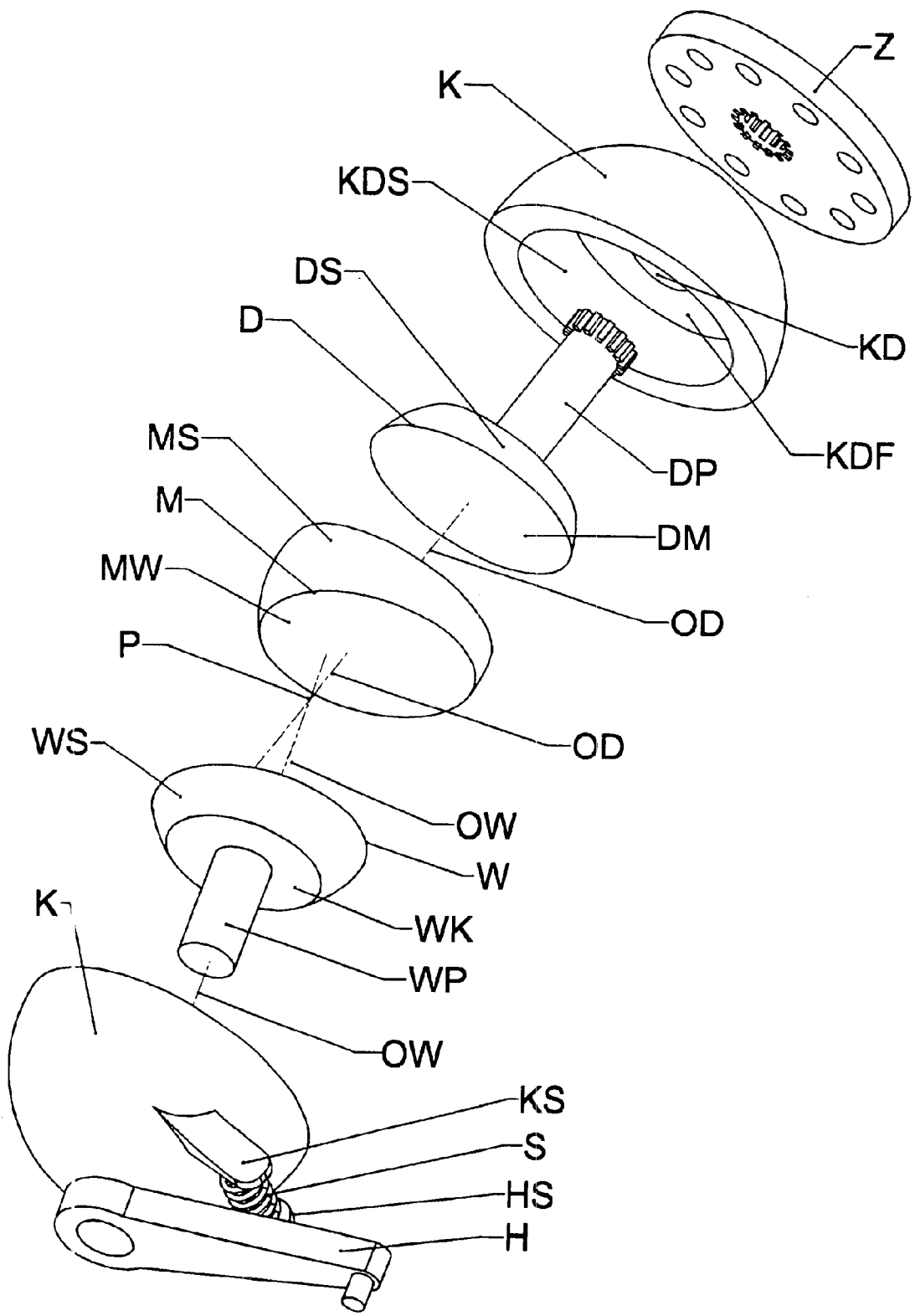

Referring to FIGS. 17–18, there is shown a suspension unit according to the present invention, which is a "spatial" analog of the suspension described in Example 4 (with minor alternations, which will be clear from the description below). More precisely, the present suspension unit has a spatial mechanism of the structure completely analogous to that of the suspension unit described in Example 6 above (with only minor alternations having no relation to the internal arrangement, nor impact on the kinetics of the mechanism), and is fitted with a coil spring compressed by two different links of the suspension mechanism (through brackets fastened to the suspension mechanism's body and a road wheel arm, which in turn is fastened to the mechanism shaft).

As mentioned above, the internal structure of the suspension mechanism (FIG. 18, see also FIGS. 15, 16) is precisely the same as that of the suspension mechanism described in Example 6, thus the description in Example 6 applies also to the mechanism of the present suspension unit. In particular, the geometry and internal kinetics (i.e. movement of any of its part relative any another of its parts) of the present suspension mechanism (therefore also relative position of all the axes of rotation of all the kinetic couples of the mechanism (only two of them, namely the axes (OW) and (OD) of rotation of the shaft (W) and the disc (D) relative the body (K) respectively, are shown in FIG. 18), including having a common intersection point (P), and any of the axes being inclined relative any other one at a non-zero angle) is precisely the same as that of the suspension mechanism described in Example 6. The only structural differences between the present suspension unit and that described in Example 6 are the following ones. For the first, the disc (D) of the present suspension spatial mechanism has a pin (DP), which is supported in a bearing (KD) placed in the body (K). For the second, fastened to the disc (D), through the pin (DP), there is a flange (Z). For the third, fastened to the body (K) there is a bracket (KS), and fastened to the wheel arm (H) there is a bracket (HS); a coil spring (S) replaces the torsion spring, said coil spring (S) being compressed between the brackets (DS) and (HS). For the fourth, the whole suspension unit is fastened to a vehicle frame through the flange (Z) on the disc (D) (thus the external kinetics of the suspension mechanism, i.e. movement of its parts relative the vehicle frame (F), necessarily differs from that of the suspension unit described in Example 6). Thus the general arrangement of the suspension unit is analogous to that of the suspension unit described in Example 4, the only differences being the following ones. For the first, the wheel arm (H) is now fastened to the shaft (W) rather than to the intermediate eccentric (M). For the second, the entire suspension unit is fastened to the vehicle frame (F) through (the flange (Z) on the pin (DP) on) the disc (D) rather than through (the flange (Z) on) the shaft (W).

Thus in the present suspension unit, unlike in that disclosed in Example 4 above, the link of the suspension mechanism which is coupled with the vehicle wheel (in this instance the shaft (W)) is not adjacent to the link (in this instance the disc (D)), through which the whole suspension unit is fastened to the vehicle frame (F).

The principal advantage of this peculiar arrangement (namely a spring being compressed by two different links of the suspension mechanism) of the suspension unit over the previous one is that the loads of the suspension mechanism can be substantially diminished (reaction force of both the suspensions being equal), and therefore the suspension unit can be made smaller and lighter.

There is a suspension with flat mechanism in accordance with the present invention, which is a full analog of the present suspension.

EXAMPLE 8

Figure 19:
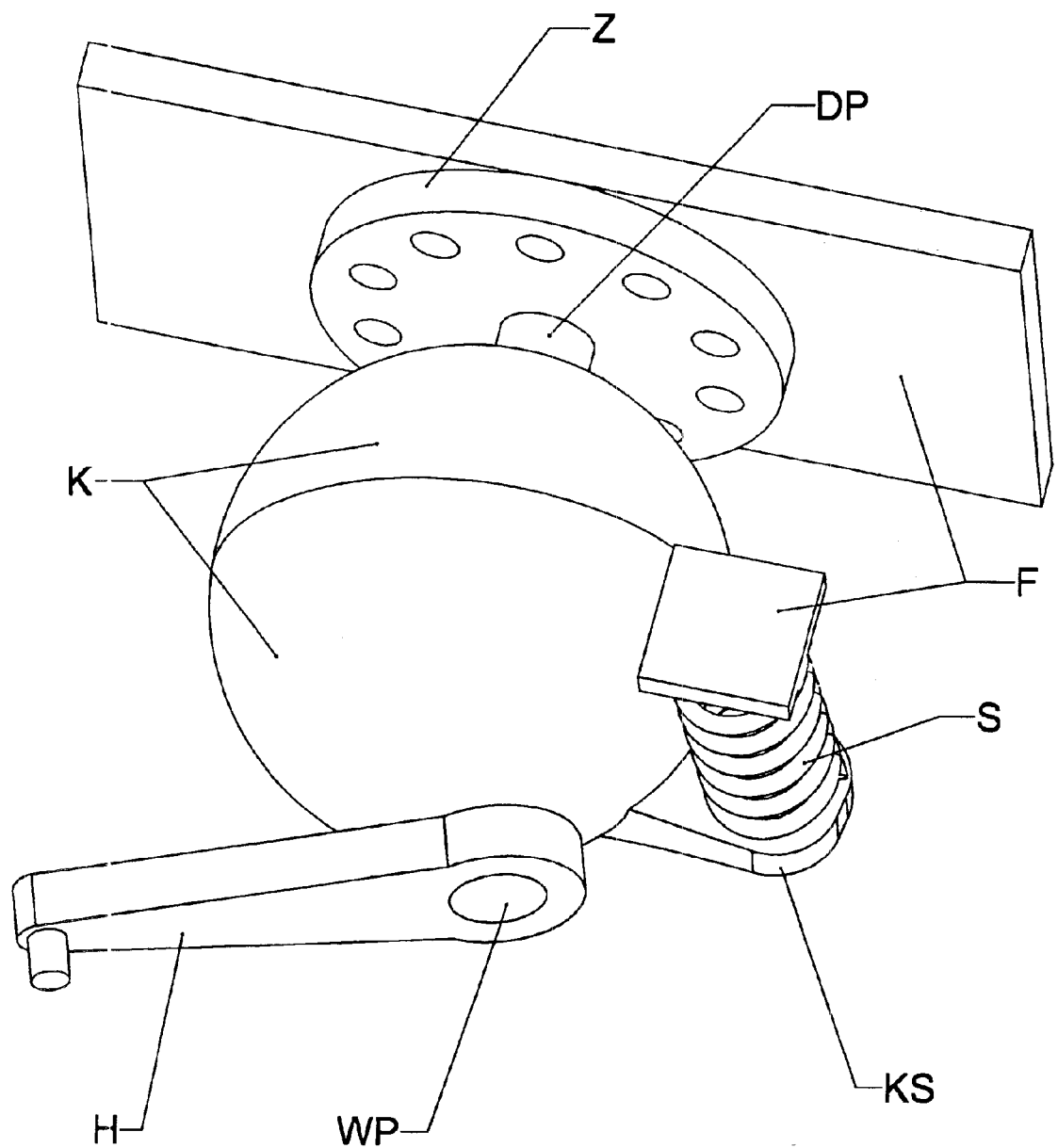
FIG. 19 is a perspective view of a variant of the suspension unit shown in FIGS. 17, 18 with one end of the coil spring is coupled with the suspension mechanism's body, the other end being supported in the vehicle frame. This is a "spatial" analog of the suspension unit illustrated in FIGS. 7–9.

Referring to FIG. 19, there is shown a suspension unit according to the present invention, which is a variant of the suspension unit described in Example 7 (FIGS. 17, 18) and is a "spatial" analog of the suspension described in Example 3 (with differently placed spring). More precisely, the present suspension unit has a spatial mechanism of the structure and kinetics (both internal and external) precisely the same as that of the suspension unit described in Example 7, and is fitted with a coil spring (S), the only difference being one end of said spring (S) is now coupled with one moving part of the suspension mechanism (namely the body (K)), the other end being supported in vehicle's frame (F). As in Example 7 the whole suspension unit is fastened to the vehicle frame (F) through the flange (Z) fastened to the pin (DP) of the mechanism disc. A trailing arm (H) is fastened to the mechanism shaft through the pin (WP).

Thus in the present suspension unit, unlike in that disclosed in Example 3 above, the link of the suspension mechanism which is coupled with the vehicle wheel (in this instance the shaft (W)) is not adjacent to the link (in this instance the disc (D)), through which the whole suspension unit is fastened to the vehicle frame (F).

There is a suspension with flat mechanism in accordance with the present invention, which is a full analog of the present suspension.

EXAMPLE 9

Figure 20:
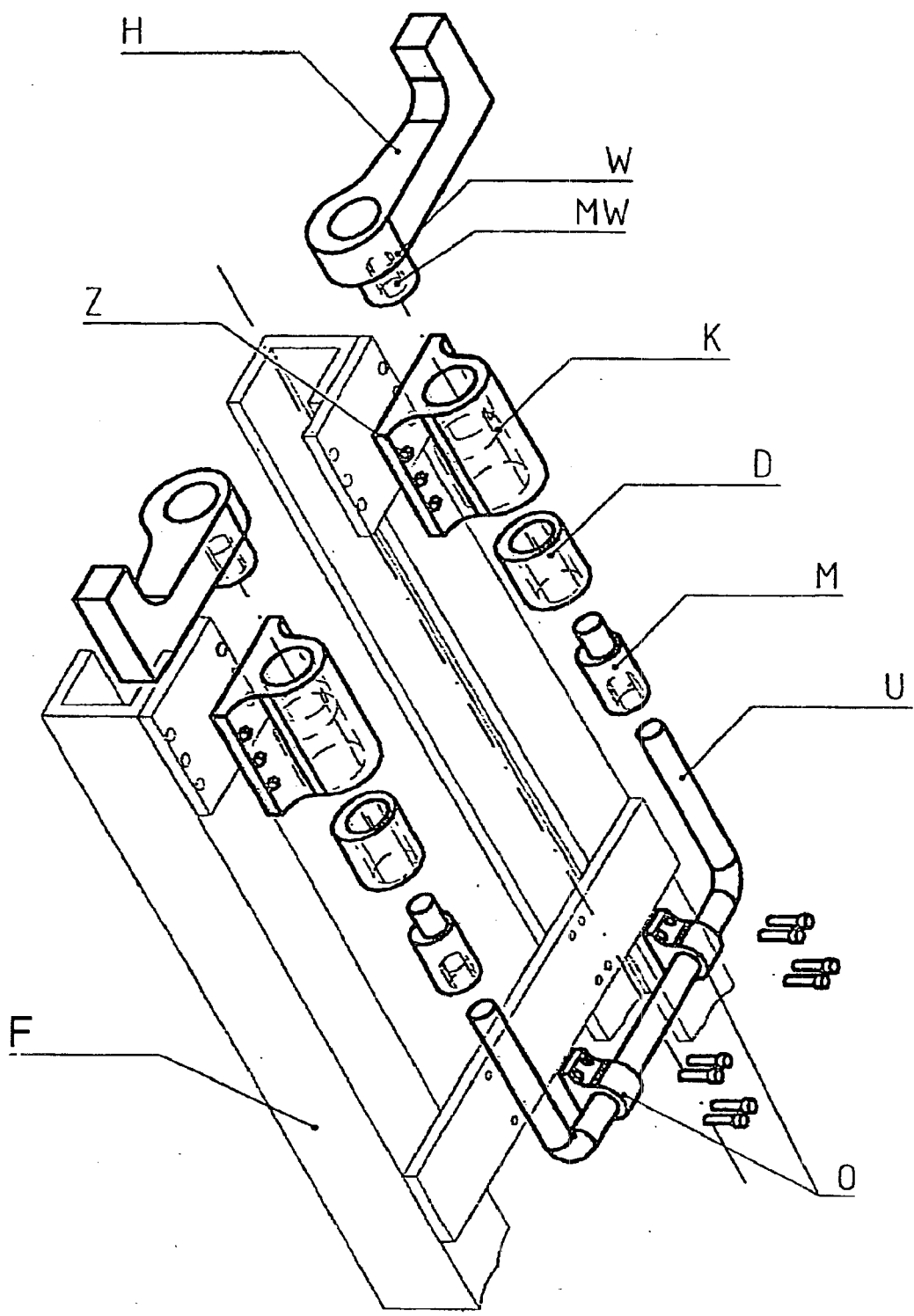
FIG. 20 is an expanded view of a vehicle suspension unit in accordance with the present invention fitted with a U-shaped torsion bar coupling two suspension's mechanisms through their intermediate eccentrics.
Figure 21:
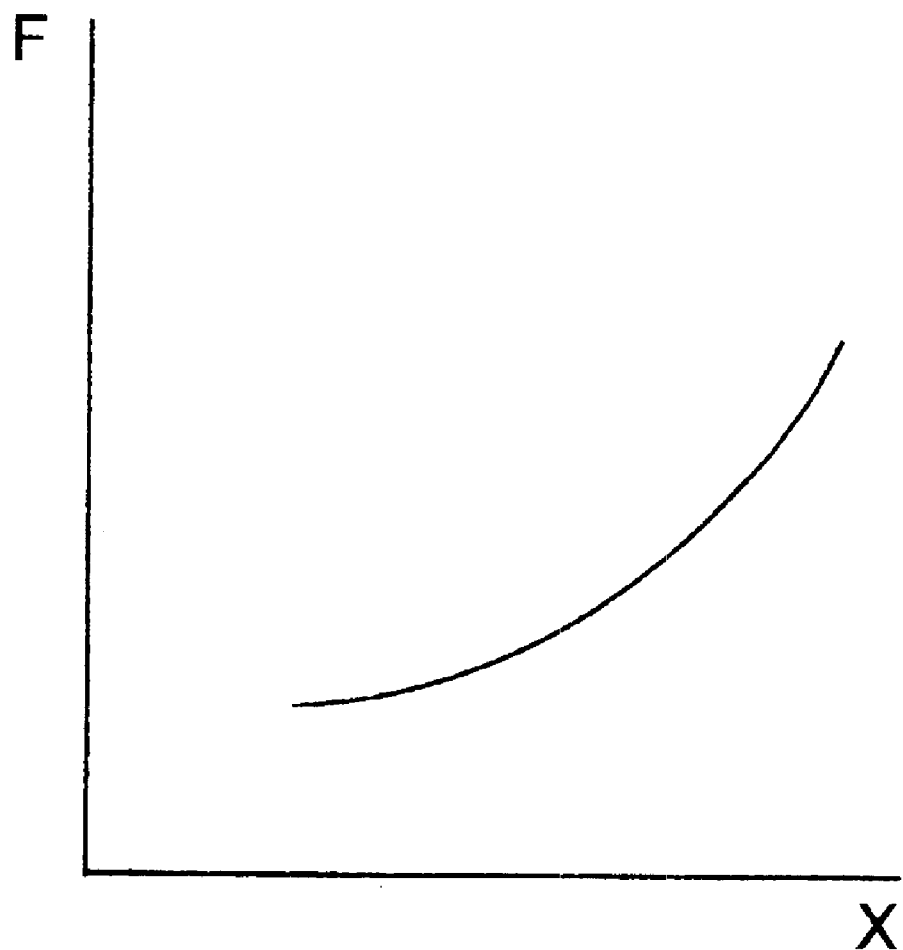
FIG. 21 provides an example of the damping characteristic of a suspension according to the present invention (the suspension answer force F as a function of wheel deflection x).

Referring to FIG. 20, there is shown a compound suspension unit for two wheels (e.g. on common axle) in accordance with the present invention. It comprises two four-link mechanisms as described in Example 1 (in fact any mechanism of the types described in Examples 1–8 could be applied), and a spring in the form of U-shaped torsion bar which works simultaneously as a stabilizer. The torsion bar is coupled rotationally with a vehicle frame (F) through clamping rings (O) at the base of the letter (U).

Thus each of the suspension's mechanisms comprises a shaft (W) fitted with an eccentric (WM) which is coupled rotationally with an intermediate eccentric (M), which, in turn, is coupled rotationally with a disc (D). The shaft (W) and the disc (D) pivot directly in a body (K). The body (K) of each mechanism is fastened to a vehicle's frame (F), the shaft (W) is coupled rigidly with an arm (H), and the intermediate eccentric (M) is coupled with one end of the U-shaped torsion bar, the other end of which is fastened to the intermediate eccentric of the analogous mechanism of the other wheel's suspension.

In both mechanisms axes of rotation of the mechanism's kinetic couples are all parallel one to another.

Owing to the application of a U-shaped torsion bar both ends of which are coupled with elements executing compound rotary-planetary motion, the bar is subject to complex stresses depending on the vehicle wheels position. In the case of identical flex of both the wheels, both the arms of the U-shaped torsion bar are being twisted and simultaneously slightly expanded, while the central part of the bar freely revolves in the clamping rings (O). In the case of various flexes of the wheels, the central part of the torsion bar (constituting the base of the letter U) is additionally being twisted. Thus the torsion bar (U) plays the role of both the main spring and the stabilizer.

The suspension, similarly to those described above, features a strongly non-linear characteristic, also for the stabilizer.

As mentioned above, there is also a variant of this compound suspension using spatial mechanisms of the type described in examples 6–8.

What I claim is:

1. A vehicle suspension system comprising a spring and at least one four-link mechanism, at least three of the links are rotationally coupled links which are able to move with respect to the reminder of the four-link mechanism, wherein a first one of said links of said mechanism is coupled with a vehicle wheel, a second one of said links is coupled with a spring, and the entire four-link mechanism is fastened to a vehicle frame through a third one of said links of said mechanism, to obtain non-linear deformation of the spring with vertical movement of the wheel, wherein three of said links are eccentric in form, whereby one of said links of said four-link mechanism is a shaft with an eccentric form, the eccentric form being coupled rotationally with a fourth link of said four-link mechanism, which is an intermediate eccentric link, the latter being coupled rotationally with the second one of said links, which is a disc, wherein said shaft and the disc pivot within the body of the third one of said links of said four-link mechanism.

2. A vehicle suspension according to claim 1, characterized in that the axes of rotation of all the rotationally coupled links are parallel to each other.

3. A vehicle suspension according to claim 1, characterized in that the axes of rotation of all the rotationally coupled links of the suspension mechanism intersect at precisely one point P, to obtain a required position of the spring relative to the vehicle wheel.

4. A vehicle suspension system according to claim 2 or claim 3, characterized by said body of said third link being fastened to the vehicle frame and said shaft being rigidly coupled with a wheel arm and wherein the disc is coupled to one end of the spring and the other end of the spring is fixed to the body of a link of a second four-link mechanism or fixed directly to the vehicle frame.

5. A vehicle suspension system according to claim 2 or claim 3, characterized by said body of said third link being fastened to the vehicle frame and said disc being rigidly coupled with a wheel arm and said shaft being coupled to one end of the spring and the other end of the spring is fixed to the body of a link of a second four-link mechanism or fixed directly to the vehicle frame.

6. A vehicle suspension system according to claim 2, characterized by said shaft (W) having a flange and the shaft is fastened to the vehicle frame at the flange, said intermediate eccentric link being coupled rigidly with a vehicle wheel arm, and said body of the third one of the links being coupled rigidly with one end of the spring, and the other end of the spring is coupled rigidly with the vehicle wheel arm or fixed to the shaft of a second four-link mechanism or directly to the vehicle frame.

7. A vehicle suspension system according to claim 2 or claim 3, characterized by said disc (D) having a flange and the disc is fastened to the vehicle frame at the flange, said shaft being coupled rigidly with a vehicle wheel arm, and said body of the third one of the links being coupled rigidly with one end of the spring, and the other end of the spring is coupled rigidly with the vehicle wheel arm or fixed to the disc of a second four-link mechanism or directly to the vehicle frame.

8. A vehicle suspension system according to claim 2 or claim 3, characterized by the body of the third one of said links being fastened to the vehicle frame, said shaft being coupled rigidly with a vehicle wheel arm, and the intermediate eccentric link being coupled with one end of the spring, and the spring being a U-shaped torsion bar, with the other end of the spring fixed to the intermediate eccentric of a second four-link mechanism which is part of a suspension arrangement of a second wheel.

* * * * *